(12) United States Patent
Usui et al.

(10) Patent No.: US 7,880,927 B2
(45) Date of Patent: Feb. 1, 2011

(54) IMAGE FORMING APPARATUS, IMAGE FORMING METHOD, PROGRAM, AND RECORDING MEDIUM

(75) Inventors: Takashi Usui, Kyoto (JP); Katsuhiro Nagayama, Nara (JP); Kiyoto Motoyama, Ikoma (JP); Kiyoshi Takato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 676 days.

(21) Appl. No.: 11/896,592

(22) Filed: Sep. 4, 2007

(65) Prior Publication Data

US 2008/0055620 A1 Mar. 6, 2008

(30) Foreign Application Priority Data

Sep. 5, 2006 (JP) .......................... P2006-240841

(51) Int. Cl.
*H04N 1/40* (2006.01)
(52) U.S. Cl. ...................... 358/1.9; 358/3.15; 358/500
(58) Field of Classification Search .................. 358/1.9, 358/2.1, 500, 504, 3.15, 3.26, 1.18
See application file for complete search history.

(56) References Cited

U.S. PATENT DOCUMENTS 4,940,998 A * 7/1990 Asakawa ..................... 347/37
7,003,152 B1 2/2006 Sawada 2004/0150857 A1 8/2004 Sawada

FOREIGN PATENT DOCUMENTS

| JP | 62-154971 A | 7/1987 |
|---|---|---|
| JP | 08-023455 A | 1/1996 |
| JP | 8-30063 | 2/1996 |
| JP | 08-191386 A | 7/1996 |
| JP | 2000-206756 A | 7/2000 |
| JP | 2004-034636 A | 2/2004 |
| JP | 2004-122692 | 4/2004 |

OTHER PUBLICATIONS

The Imaging Society of Japan, "Electro photography-Base and Application", Corona Publishing Co., Ltd., p. 208-211, p. 468, 1996.

* cited by examiner

*Primary Examiner*—Thomas D Lee
*Assistant Examiner*—Stephen M Brinich
(74) *Attorney, Agent, or Firm*—Birch, Stewart, Kolasch & Birch, LLP

(57) ABSTRACT

An image forming apparatus, an image forming method, a program, and a recording medium that succeed in reducing recording agent consumption without causing image quality degradation are provided. A modification region processing section detects, out of image data, A locations where a region identification signal provided from a region separation processing section changes from a ground region mode to a character region mode, and vice versa, as the boundary between the ground region and the character region, and thereby specifies a modification region which is continuous with the ground region and overlaps with a part of a periphery of the character region which is contiguous to the ground region. The modification region is assigned color data indicating a color that can be represented by the recording agent for use in ground region formation thereby to generate image data.

14 Claims, 15 Drawing Sheets

| | | PIXEL | | |
|---|---|---|---|---|
| 0 | 1 | 3 | 1 | 0 |
| 1 | 3 | 5 | 3 | 1 |
| 0 | 1 | 3 | 1 | 0 |

|   |   | PIXEL |   |   |
|---|---|---|---|---|
| 1 | 1 | 2 | 2 | 1 |
| 1 | 2 | 3 | 1 | 1 |
| 1 | 1 | 1 | 2 | 1 |

IMAGE FORMING APPARATUS, IMAGE FORMING METHOD, PROGRAM, AND RECORDING MEDIUM

CROSS-REFERENCE TO RELATED APPLICATION

This application claims priority to Japanese Patent Application No. 2006-240841, which was filed on Sep. 5, 2006, the contents of which are incorporated herein by reference in its entirety.

BACKGROUND OF THE INVENTION

1. Field of the Invention

The present invention relates to an image forming apparatus such as a color copying machine capable of forming an image on a recording medium with use of recording agents of either two or more than two colors, an image forming method, a program, and a recording medium.

2. Description of the Related Art

In Japanese Unexamined Patent Publication JP-A 62-154971 (1987), in a digital color recording apparatus designed to perform recording with use of recording agents of four colors: C (cyan), M (magenta), Y (yellow), and K (black), on the basis of three-color data obtained through dot development on three-color density data and print-dot positional information, four-color (including a black color) printing data is produced thereby to effect image formation. In this construction, replacement of a composite-color black formed by superimposing three colors: C, M, and Y one after another with a single-color black (K) is conducted in such a manner that the single-color black accounts for almost one half and the C, M, Y-composite color black accounts for the rest.

Moreover, in Japanese Unexamined Patent Publication JP-A 2004-34636, in effecting image formation in an image forming apparatus employing the electrophotographic printing method, in order to avoid that, on the border between a character rendered in a black color and an underlying picture, the color of a recording medium is visible along the outline of the character, so-called Pure Black is used for rendering a character portion in the absence of the under picture, whereas so-called Process Black is used for a black character-under picture overlapping portion, with the under picture and the overlying character processed under the same image-rendering conditions. Process Black is composed of a mixture of C (cyan), M (magenta), and Y (yellow).

In JP-A 62-154971, when there arises misregistration of images that have been formed of the recording agents of four colors: C, M, Y, and K, respectively, in an out-of-register color region around the black-color image formed of the recording agent K is created an image of the C, M, Y-composite color black. This image is created regardless of the presence or absence of a background. Therefore, a background-free area, namely an area around which is formed no image composed of the recording agent, suffers from image quality degradation.

In JP-A 2004-34636, in effecting image formation, the black character-under picture overlapping portion is rendered by Process Black composed of a mixture of C, M, and Y. In this case, the amount of recording agent consumption is large, and also a black character, even as a single piece, is composed of a combination of Pure Black-made portions and Process Black-made portions. This gives rise to a problem of image quality degradation.

SUMMARY OF THE INVENTION

It is an object of the invention to provide an image forming apparatus, an image forming method, a program, and a recording medium that succeed in reducing recording agent consumption and in preventing degradation of image quality.

The invention provides an image forming apparatus capable of forming an image on a recording medium on the basis of image data with use of recording agents of either two or more than two colors, comprising:

a detecting section for detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;

a region adjusting section for specifying, on the basis of a detection result produced by the detecting section, a third region which is continuous with the second region and overlaps with a part of a periphery of the first region which is contiguous to the second region, and assigning the third region third color data indicating a color that can be represented by the recording agents used for forming the first and second regions; and an image forming section for forming an image on a recording medium with use of the recording agents corresponding to the colors indicated by the first to third color data assigned to the first to third regions, respectively.

According to the invention, in the image represented by the image data, the first region is assigned the first color data indicating a predetermined color, and the second region is assigned the second data indicating a color different from the predetermined color. The first region refers to a region which should be formed by using, out of the recording agents of either two or more than two colors, only one of them that corresponds to the predetermined one color. The second region refers to a region which should be formed by using, out of the recording agents of either two or more than two colors, the one that is different from the recording agent for forming the first region. An image constituted by the first region (hereafter referred to as "the first image") and an image constituted by the second region (hereafter referred to as "the second image") are formed of different recording agents. Therefore, when the first image and the second image are misaligned, conventionally, the mutually contiguous portions of the first and second images would be separated from each other, which results in exposure of the recording medium. In this regard, according to the invention, the region adjusting section specifies the third region which is continuous with the second region and overlaps with a part of the periphery of the first region which is contiguous to the second region. Moreover, the third region is assigned the third color data indicating a color that can be represented by the recording agents used for forming the first and second regions. In this way, during the formation of images on the recording medium, even if the images formed of the individual recording agents are positionally deviated relative to each other and consequently the first image and the second image are separated from each other, in the presence of an image constituted by the third region (hereafter referred to as "the third image"), it is possible to prevent part of the recording medium from being exposed at the location where the first image and the second image should basically make contact with each other, and thereby prevent image quality degradation.

Moreover, since the third region overlaps with a part of the periphery of the first region which is contiguous to the second region, it is possible to reduce the amount of consumption of the recording agent to be used for the image constituted by the third region.

In the invention, it is preferable that the detecting section detects, as the first region, a character region representing characters including a letter and a symbol and also detects, as the second region, a ground region which is a background against which the character region exists, and that the region adjusting section makes adjustment in a manner so as to insure that the color indicated by the third color data is identical with the color indicated by the second color data.

According to the invention, the first region refers to the character region representing characters including a letter and a symbol. The second region refers to the ground region which is a background against which the character region exists. The third region is represented by the same color as that of the ground region. In this case, even if the third region is provided in the image formed on the recording medium, a character size remains unchanged. This makes it possible to avoid that a letter and a symbol become hard to make out in the image formed on the recording medium.

In the invention, it is preferable that the detecting section detects, out of the character region, a black color-corresponding region as the first region.

According to the invention, the detecting section detects, out of the character region, a black color-corresponding region as the first region. In a case where an image is formed on a white-color recording medium, if part of the white-color recording medium is exposed at the periphery of the region rendered in a black color, the quality of the image will be degraded significantly due to a high degree of contrast. In this regard, according to the invention, in a case where an image is formed on a white-color recording medium, even if a black color-rendered region is present in the character region, image quality degradation can be prevented successfully.

In the invention, it is preferable that the detecting section detects the first and second regions on the basis of the brightness and chroma of each pixel in the image data.

According to the invention, the detecting section detects the first and second regions on the basis of the brightness and chroma of each pixel in the image data. In this case, there is no need for either of the first region and the second region to be a complete Pure Black region. That is, even if neither of the first region and the second region is a complete Pure Black region, so long as the first and second regions exhibit different colors, it is possible to detect these regions on an individual basis. Accordingly, in images of various types, the first and second regions can be detected properly, whereby making the aforestated setting of the third region possible. This helps increase the possibility of providing the aforestated advantages of the invention in dealing with formation of various types of images.

Moreover, in order to derive the brightness on the basis of the R (red), G (green), B (blue)-corresponding signals, the calculation may be made in accordance with the widely-used NTSC (National Television Standards Committee)-compliant video signal system given by the following formula:

$$Y \text{ (brightness)} = 0.299 \times R + 0.587 \times G + 0.114 \times B$$

There are several methods to derive the chroma. For example, a value obtained simply by exploiting the differential between the maximum value and the minimum value in the R, G, B-corresponding signals can be used in substitution for the chroma.

In the invention, it is preferable that, in the region adjusting section, the third region includes, out of the image represented by the image data, a predetermined area range which conforms to a part extending from a boundary between the first region and the second region to a certain first region-side location in terms of a direction corresponding to a main scanning direction in which an image is formed on a recording medium by the image forming section.

According to the invention, in the image data-based image processing operations, the image data is processed in turn in the main scanning direction on a pixel-by-pixel basis. In this case, it is possible to lighten data processing loads entailed by the setting of the third region through the detection of the boundary between the first region and the second region.

In the invention, it is preferable that, in the region adjusting section, the third region includes, out of the image represented by the image data, a predetermined area range which conforms to a part extending from the boundary between the first region and the second region to a certain first region-side location in terms of a direction corresponding to a sub scanning direction in which an image is formed on a recording medium by the image forming section.

According to the invention, the misregistration of images formed of the individual recording agents is likely to occur in the sub scanning direction. Therefore, for example, by making adjustment in such a manner that the third region includes the predetermined area range, namely the part extending from the boundary between the first region and the second region to a certain second region-side location in terms of a direction corresponding to the sub scanning direction, it is possible to prevent occurrence of the misregistration of images formed of the individual recording agents. Moreover, image quality degradation resulting from the provision of the third region can be reduced to a minimum.

In the invention, it is preferable that the image forming apparatus further comprises a storage section for storing therein the data indicating the predetermined area range, and that the region adjusting section specifies the third region on the basis of the area-range data stored in the storage section.

According to the invention, the region adjusting section specifies the third region on the basis of the area-range data stored in the storage section. For example, in a case where the storage section is factory-adjusted to store therein the data of an optimal area range determined in conformity with the image forming apparatus, image quality degradation can be prevented without fail.

In the invention, it is preferable that the image forming apparatus further comprises an input section for inputting predetermined data; and an area-range changing section for making a change to the area-range data stored in the storage section in response to the predetermined data inputted by the input section.

According to the invention, with the input of the predetermined data by the input section, the area-range data stored in the storage section can be altered by the area-range changing section. This allows users to alter the area-range data in response to the condition of usage of the image forming apparatus. Accordingly, image quality degradation that has yet to be eliminated at the time of shipment of the image forming apparatus, as well as image quality degradation caused by deterioration of the image forming apparatus with time, can be coped with properly.

In the invention, it is preferable that, in the region adjusting section, the predetermined area range is selected as 200 μm or below with respect to the boundary.

According to the invention, the predetermined area range is selected as 200 μm or below with respect to the boundary between the first region and the second region. For example, in an image forming apparatus having a resolution of 600 dpi (Dot Par Inch), the predetermined area range of 200 μm is equal to approximately 4 dots. In the image forming apparatus having a resolution of 600 dpi, by adjusting the level of misregistration between the image corresponding to the first region and the image corresponding to the second region to be 4 dots or below, it is possible to ensure high image quality even in the presence of misregistration between the image corresponding to the first region and the image corresponding to the second region. By setting the predetermined area range at or below 200 μm, even if 4-dot misregistration occurs in the image corresponding to the first region and the image corresponding to the second region, high image quality can be ensured without fail and also the amount of the recording agent to be used can be reduced.

The invention provides an image forming method that allows formation of an image on a recording medium on the basis of image data with use of recording agents of either two or more than two colors, comprising the steps of:

detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;

specifying, on the basis of a detection result thus produced, a third region which is continuous with the second region and overlaps with a part of a periphery of the first region which is contiguous to the second region, and assigning the third region third color data indicating a color that can be represented by the recording agents used for forming the first and second regions; and forming an image on a recording medium with use of the recording agents corresponding to the colors indicated by the first to third color data assigned to the first to third regions, respectively.

According to the invention, in the image represented by the image data, the first region is assigned the first color data indicating a predetermined color, and the second region is assigned the second data indicating a color different from the predetermined color. The first region refers to a region which should be formed by using, out of the recording agents of either two or more than two colors, only one of them that corresponds to the predetermined one color. The second region refers to a region which should be formed by using, out of the recording agents of either two or more than two colors, the one that is different from the recording agent for forming the first region. An image constituted by the first region (hereafter referred to as "the first image") and an image constituted by the second region (hereafter referred to as "the second image") are formed of different recording agents. Therefore, when the first image and the second image are misaligned, conventionally, the mutually contiguous portions of the first and second images would be separated from each other, which results in exposure of the recording medium. In this regard, according to the invention, there is specified the third region which is continuous with the second region and overlaps with a part of the periphery of the first region which is contiguous to the second region. Moreover, the third region is assigned the third color data indicating a color that can be represented by the recording agents used for forming the first and second regions. In this way, during the formation of images on the recording medium, even if the images formed of the individual recording agents are positionally deviated relative to each other and consequently the first image and the second image are separated from each other, in the presence of an image constituted by the third region (hereafter referred to as "the third image"), it is possible to prevent part of the recording medium from being exposed at the location where the first image and the second image basically makes contact with each other, and thereby prevent image quality degradation.

Moreover, since the third region overlaps with a part of the periphery of the first region which is contiguous to the second region, it is possible to reduce the amount of consumption of the recording agent to be used for the image constituted by the third region.

The invention provides a program for allowing a computer to operate as an image forming apparatus that is capable of forming an image on a recording medium on the basis of image data with use of recording agents of either two or more than two colors, comprising:

making the computer to function as a detecting section for detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;

a region adjusting section for specifying, on the basis of a detection result produced by the detecting section, a third region which is continuous with the second region and overlaps with a part of a periphery of the first region which is contiguous to the second region, and assigning the third region third color data indicating a color that can be represented by the recording agents used for forming the first and second regions; and an image forming section for forming an image on a recording medium with use of the recording agents corresponding to the colors indicated by the first to third color data assigned to the first to third regions, respectively.

According to the invention, the various functions described just above can be carried out by the computer. That is, it is possible to achieve the same effects as achieved in the aforestated image forming apparatus.

The invention provides a computer-readable recording medium on which is recorded the program.

According to the invention, the recording medium is read by the computer thereby to accomplish the various functions under the control of the computer.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
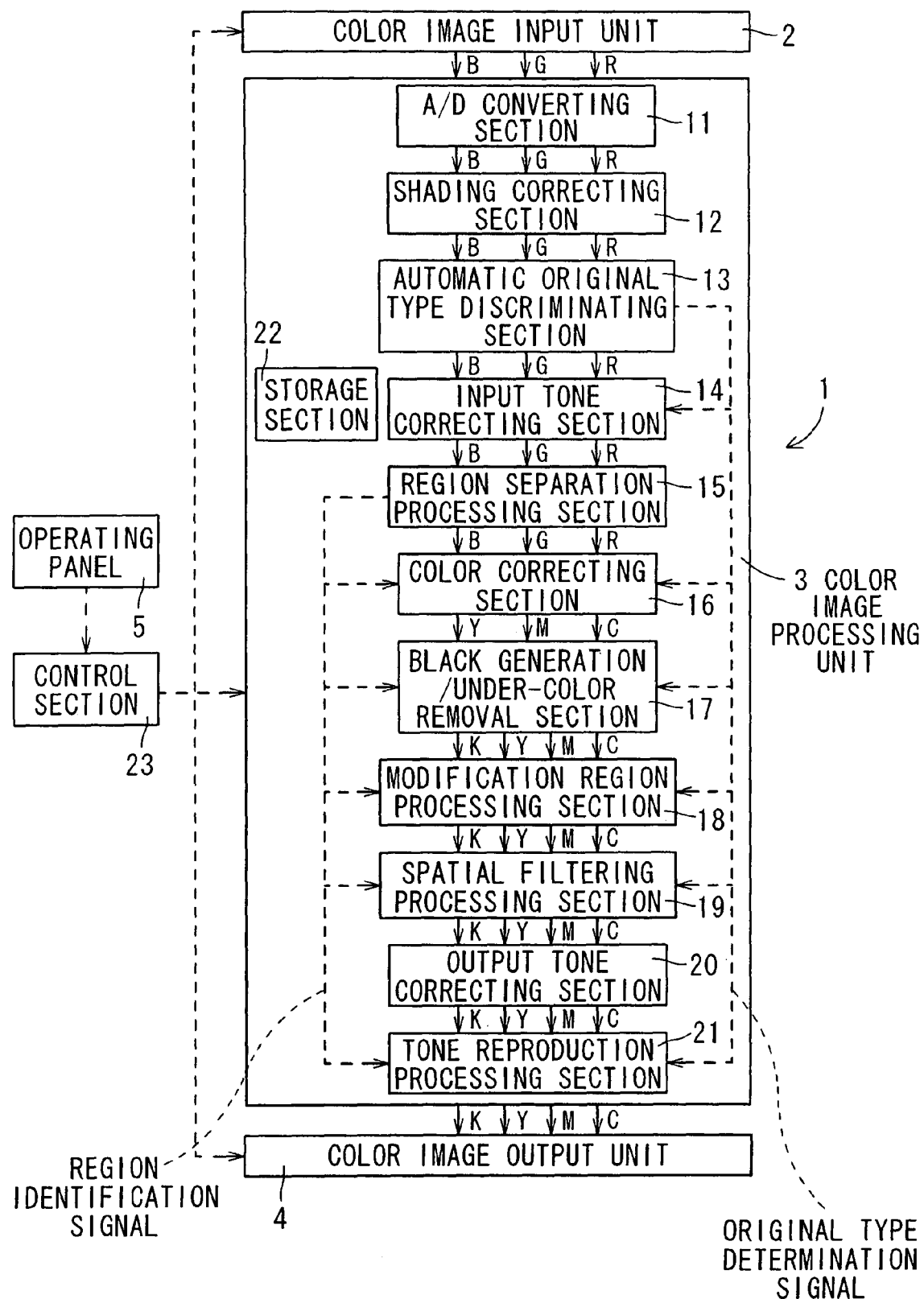
FIG. 1 is a block diagram showing the constitution of an image forming apparatus in accordance with one embodiment of the invention.

Now referring to the drawings, preferred embodiments of the invention are described below.

FIG. 1 is a block diagram showing the constitution of an image forming apparatus 1 in accordance with one embodiment of the invention. In this embodiment, the image forming apparatus 1 is applied to an electrophotographic printing-type digital color copying machine. In this embodiment, the image forming apparatus 1 is designed to be able to identify an original which stands midway between a dot-printed original and a printing paper photograph original in property. Examples of an original of this type include an original on which a high-density image area and a low-density image area coexist as a result of image formation effected by a low-resolution to medium-resolution ink jet printing-type image forming apparatus with use of high-concentration ink, and an original which is low in image density as a whole as a result of image formation effected with use of low-concentration ink. Some originals produced by an electrophotographic printing-type image forming apparatus have properties similar to those of an original of this type. Hereinafter, an original of this type will be referred to as a "specific ink-jet printed or otherwise outputted original".

The image forming apparatus is composed of a color image input unit 2, a color image processing unit 3, a color image output unit 4, and an operating panel 5. The color image processing unit 3 comprises an A/D converting section 11, a shading correcting section 12, an automatic original type discriminating section 13, an input tone correcting section 14, a region separation processing section 15, a color correcting section 16, a black generation/under-color removal section 17, a modification region processing section 18, a spatial filtering processing section 19, an output tone correcting section 20, a tone reproduction processing section 21, a storage section 22, and a control section 23.

The color image input unit 2, which acts as an image reader, comprises a scanner portion (not shown) provided with a CCD (Charge Coupled Device) color image sensor. In the color image input unit 2, the CCD color image sensor reads a reflected light image from an original to generate image data composed of RGB (R: red, G: green, B: blue)-corresponding analog signals indicating the reflectivity of light reflected from a recording medium such as a paper sheet on which is recorded an original image. The image data thus generated is inputted to the color image processing unit 3. The analog signal-based image data which is provided from the color image input unit 2 to the color image processing unit 3 is rasterized.

The read-out image data produced by the color image input unit 2 is transmitted to the A/D converting section 11, the shading correcting section 12, the automatic original type discriminating section 13, the input tone correcting section 14, the region separation processing section 15, the color correcting section 16, the black generation/under-color removal section 17, the modification region processing section 18, the spatial filtering processing section 19, the output tone correcting section 20, and the tone reproduction processing section 21, which are each included in the color image processing unit 3, successively in the order named. In the end, the image data is outputted, in the form of image data represented by CMYK (C: cyan, M: magenta, Y: yellow, K: black)-corresponding digital color signals, to the color image output unit 4.

The A/D converting section 11 converts the RGB-corresponding analog signal-based image data into digital signal-based image data. In the shading correcting section 12, the RGB-corresponding digital signal-based image data sent from the A/D converting section 11 is subjected to correction processing for removing various types of distortions arising from the illuminating system, focusing system, and imaging system of the color image input unit 2. Moreover, the shading correcting section 12 effects color balance adjustment.

In the automatic original type discriminating section 13, the type of an original is determined on the basis of the image data composed of digital signals indicating RGB-corresponding reflectivity, which has undergone removal of various types of distortions and color balance adjustment in the shading correcting section 12. An original type determination signal indicating the kind of an original that has been generated by the automatic original type discriminating section 13 is outputted to the input tone correcting section 14, the color correcting section 16, the black generation/under-color removal section 17, the modification region processing section 18, the spatial filtering processing section 19, and the tone reproduction processing section 21 successively. Note that the details of the automatic original type discriminating section 13 will hereinafter be described.

In the input tone correcting section 14, image quality control processing operations, such as removal of ground density and contrast adjustment, are performed to achieve color balance adjustment to the image data composed of RGB-corresponding digital signals. The input tone correcting section 14 receives the image data composed of digital signals indicating RGB-corresponding reflectivity from the shading correcting section 12. In the input tone correcting section 14, the image data composed of RGB-corresponding digital signals is subjected to color balance adjustment, and simultaneously the digital signals indicating reflectivity (reflectance signals) are converted into such signals as are easily handled in the color image processing unit 3, in this embodiment, digital signals indicating density (density signals). The input tone correcting section 14 provides the image data composed of RGB-corresponding density signals to the region separation processing section 15. Note that originals (paper sheets on which are printed characters and so forth) in general have different ground colors. For example, in a case of using yellowish paper such as coarse paper, its ground color needs to be regarded as "white color". Otherwise, an extra amount of recording agent will be used in the blank portion (ground portion) of the paper at the time of producing printed output. In light of this, the input tone correcting section 14 performs removal of ground density; that is, the density of the ground is adjusted to conform to the density of white color. At the same time, the scaling of contrast is carried out. Moreover, the input tone correcting section 14 is also utilized for the subsequently-described processing to be effected by the region separation processing section 15.

In the region separation processing section 15, in response to the RGB-corresponding density signals, the classification of pixels in the image data inputted to the color image processing unit 3 is effected under the following groups: a ground region; a photograph (printing paper photograph) region; a character region; and a dot region, and further under the following groups: color rendition region; and monochromatic rendition region. The region separation process effected by the region separation processing section 15 is analogous to the process effected by the automatic original type discriminating section 13 that will hereinafter be described. Therefore, no description as to the region separation process will be given below. In the present embodiment, the term "region separation" refers to separation of a single image into different regions, i.e., the character region, the photograph (image) region, and the dot region, as well as the color rendition region and monochromatic rendition region. The character region represents characters including a letter and a symbol. The ground region represents a background against which either of the character region, the photograph region, and the dot region exists. On the basis of the result of separation, the region separation processing section 15 produces output of a region identification signal, which indicates to which of the regions each of the pixels belongs, to the color correcting section 16, the black generation/under-color removal section 17, the spatial filtering processing section 19, and the tone reproduction processing section 21 successively. Moreover, from the region separation processing section 15, the RGB-corresponding density signals produced by the input tone correcting section 14 are outputted in an as-is state to the color correcting section 16 located downstream thereof.

Moreover, in effecting separation processing operations in the region separation processing section 15, by performing tone correction in advance, it is possible to, for example, make a distinction between a chromatic color character and a black character efficiently with high precision. Accordingly, with the provision of the input tone correcting section 14 described hereinabove, the separation process can be achieved in the region separation processing section 15 efficiently with high precision.

In the color correcting section 16, in response to the region identification signals provided from the region separation processing section 15, the RGB-corresponding density signals (input signals) provided from the region separation processing section 15 are converted into CMY-corresponding density signals (hereafter referred to as "CMY signals"). That is, the conversion of the RGB-corresponding density signals into the CMY-corresponding signals is performed by the color correcting section 16. In order to implement faithful color reproduction, the color correcting section 16 performs processing for removing color muddiness induced by unnecessary absorbing components included in the CMY coloring materials on the basis of the spectral characteristics thereof. Moreover, the color correcting section 16 performs color conversion in response to the region identification signals provided from the region separation processing section 15 and original type determination signals provided from the automatic original type discriminating section 13.

The color correcting section 16 performs signal conversion with reference to a lookup table for color conversion use. For example, the color conversion lookup table is stored in the storage section 22. The color correcting section 16 performs, for example, a processing operation (b) or processing operations (a), (b), and (c) as set forth hereunder.

(a) tone correction for input signals
(b) conversion of an input signal into an output signal with use of a multi-dimensional lookup table
(c) tone correction for output signals In regard to the dimension of the multi-dimensional lookup table, given the number of input signals of n, then the lookup table is defined as the n-dimensional lookup table. That is, when there are three input signals such as RGB-corresponding signals, the lookup table is defined as the three-dimensional lookup table.

The black generation/under-color removal section 17 performs black generation processing for generating a black signal corresponding to a black color (K) on the basis of the CMY-corresponding signals following the completion of color correction in the color correcting section 16, and also performs signal generation processing for generating new CMY signals by subtracting the K signal obtained by the black generation processing from the original CMY signals.

The new CMY signals thus obtained are converted into four-color, CMYK-corresponding signals (hereafter referred to as "CMYK signals").

Taken up as an example of methods to perform the black generation processing in the black generation/under-color removal section 17 is a skeleton black method. In the black generation processing in accordance with the skeleton black method, the input/output characteristics of the skeleton curve is expressed by y=f (x). The input C, M, Y-corresponding concentrations are given as C, M, and Y, respectively. The output C, M, Y, K-corresponding concentrations are given as C', M', Y', and K', respectively. The UCR (Under Color Removal) rate is expressed by $\alpha(0<\alpha<1)$. Under these conditions, in the black generation/under-color removal processing, three-color CMY density signals are converted into four-color CMYK density signals in accordance with the following formulae (1) through (4):

$$K'=f\{\min(C, M, Y)\} \quad (1)$$

$$C'=C-\alpha K' \quad (2)$$

$$M'=M-\alpha K' \quad (3)$$

$$Y'=Y-\alpha K' \quad (4)$$

In the black generation/under-color removal section 17, the UCR rate of the character region is set at 1. Thereby, in a case where color data indicating a black color is assigned to the character region, a part of an image formed on a recording medium which corresponds to the character region is composed solely of the recording agent K.

In the modification region processing section 18 which acts as a detecting section as well as a region adjusting section, in response to the region identification signals provided from the region separation processing section 15 and original type determination signals provided from the automatic original type discriminating section 13, a modification region is specified in the image data represented by the four-color CMYK density signals provided from the black generation/under-color removal section 17. Then, color data indicating a predetermined color is assigned to the modification region to generate modification image data. A description as to the modification region processing section 18 will be given later on.

In the spatial filtering processing section 19, in response to the region identification signals provided from the region separation processing section 15, spatial filtering processing is performed on the CMYK-signal image data provided from the modification region processing section 18 by means of digital filters which are determined on an region-by-region basis in advance. In this way, the spatial frequency characteristics of the CMYK signals can be corrected, thereby preventing occurrence of blurring and degradation of graininess in an output image.

The tone reproduction processing section 21, just like the spatial filtering processing section 19, performs a predetermined processing operation on the CMYK-signal image data provided from the spatial filtering processing section 19 in response to the region identification signals provided from the region separation processing section 15. For example, in regard to an image region which has been separated as the character region by the region separation processing section 15, sharpness enhancement is carried out in the spatial filtering processing by the spatial filtering processing section 19 to increase the degree of enhancement at high frequency, thereby enhancing the reproducibility of a black character or a chromatic color character in particular. Then, in the tone reproduction processing section 21, the character region is subjected to binarization processing or multi-level processing with use of a high-resolution screen suitable for high-frequency reproduction. Moreover, in regard to an image region which has been separated as the dot region by the region separation processing section 15, low-pass filtering is carried out by the spatial filtering processing section 19 to remove an input dot component. After that, the output tone correcting section 20 performs output tone correction processing for converting a signal such as a density signal into a dot area index that is the characteristic value of the color image output unit 4. Finally, the tone reproduction processing section 21 performs tone reproduction processing (halftone generation processing) for dividing the image into pixels to reproduce a variety of tones. Further, in regard to an image region which has been separated as the photograph region by the region separation processing section 15, binarization processing or multi-level processing is performed with use of a tone reproducibility-oriented screen.

For example, the operating panel 5 is composed of a display portion (not shown) such as a liquid crystal display and setting buttons. The input data is transmitted from the operating panel to the control section 23. The control section 23 exercises control over the color image input unit 2, the color image processing unit 3, and the color image output unit 4 in accordance with the input data from the operating panel 5.

The storage section 22 is composed of a volatile recording medium such as a RAM (Random Access Memory) and a nonvolatile recording medium such as a flash memory. The image data outputted from the tone reproduction processing section 21, namely, the image data having undergone various processing operations as stated above is temporarily stored in the storage section 22. The image data loaded from the storage section 22 with a predetermined timing is inputted to the color image output unit 4.

The color image output unit 4, which acts as an image forming section, produces output of image data in the form of an image on a recording medium (a sheet body such as paper, for instance). The color image output unit 4 is capable of forming an image on a recording medium with use of recording agents of either two or more than two colors. In the present embodiment, the color image output unit 4 is designed to be able to form an image on a recording medium with use of recording agents of four colors: C, M, Y, and K. In the color image output unit 4, image formation on the basis of the C-corresponding image data is effected with use of the recording agent C; image formation on the basis of the M-corresponding image data is effected with use of the recording agent M; image formation on the basis of the Y-corresponding image data is effected with use of the recording agent Y; and image formation on the basis of the K-corresponding image data is effected with use of the recording agent K. The color image output unit 4 is capable of forming images on a recording medium with use of the recording agents corresponding to the individual colors represented by the color data assigned to the character region, the ground region, and the modification region, respectively. In the present embodiment, the color image output unit 4 is implemented by way of an electrophotographic printing-type printer apparatus. However, as another embodiment of the invention, the color image output unit 4 may be implemented by way of an ink jet printing-type printer apparatus. The constituent portions of the color image processing unit 3 are each operated under the control of the control section 23. The control section 23 is composed of a CPU (Central Processing Unit) and a storage medium in which is stored a control program which is executed by the CPU. The color image input unit 2, the color image processing unit 3, and the color image output unit 4 are controlled by executing the control program in the CPU.

Figure 2:
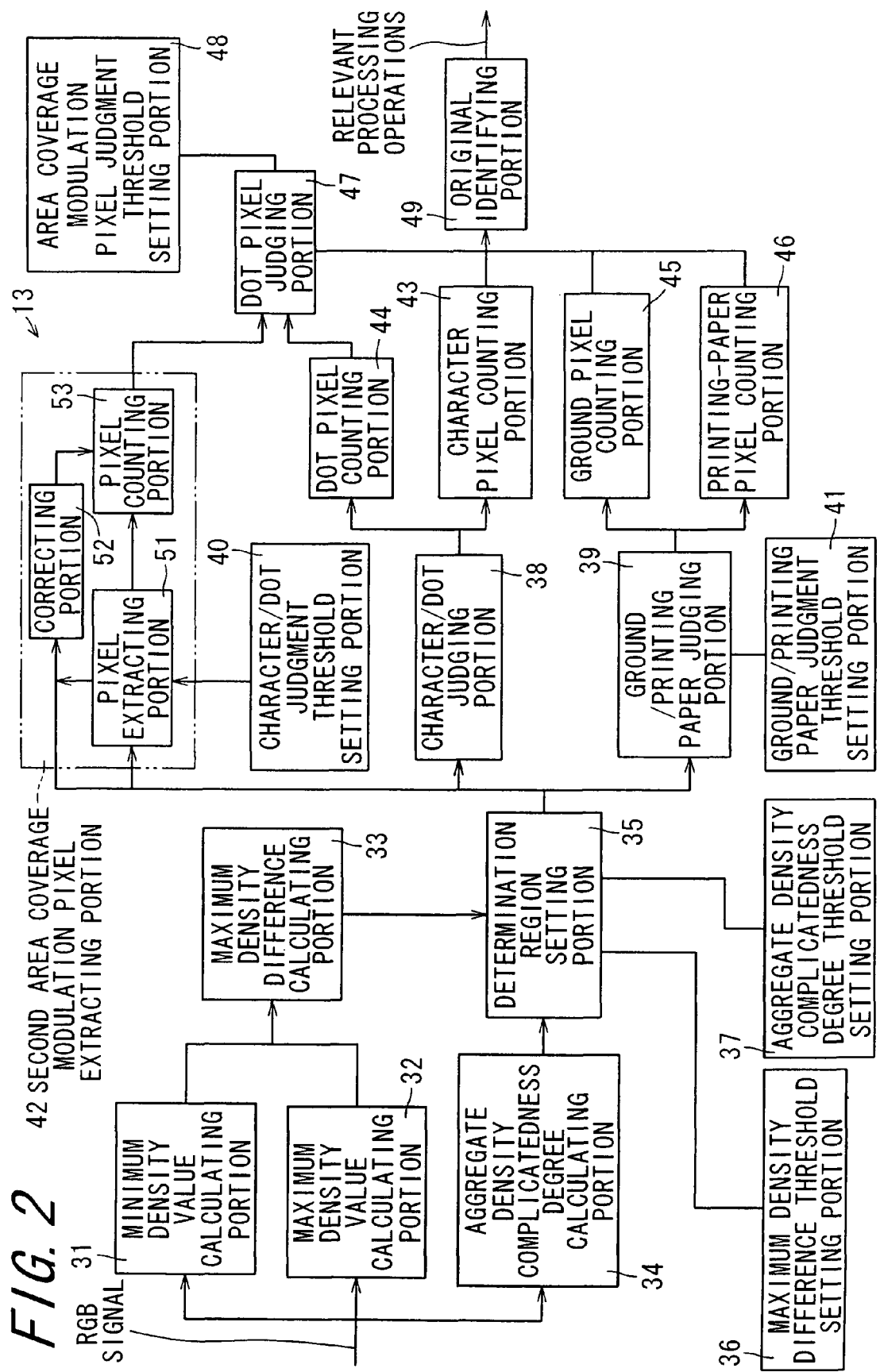
FIG. 2 is a block diagram showing the configuration of an automatic original type discriminating section.

FIG. 2 is a block diagram showing the configuration of the automatic original type discriminating section 13. The automatic original type discriminating section 13 is composed of a minimum density value calculating portion 31 (characteristic amount extracting portion), a maximum density value calculating portion 32 (characteristic amount extracting portion), a maximum density difference calculating portion 33 (characteristic amount extracting portion), an aggregate density complicatedness degree calculating portion 34 (characteristic amount extracting portion), a determination region setting portion (a first area coverage modulation pixel detecting portion, a second area coverage modulation pixel detecting portion) 35, a maximum density difference threshold setting portion (determination standard setting portion) 36, an aggregate density complicatedness degree threshold setting portion (determination standard setting portion) 37, a character/dot judging portion (the first area coverage modulation pixel detecting portion) 38, a ground/printing paper judging portion 39, a character/dot judgment threshold setting portion (determination standard setting portion) 40, a ground/printing paper judgment threshold setting portion 41, a second area coverage modulation pixel extracting portion 42, a character pixel counting portion 43, a dot pixel counting portion 44, a ground pixel counting portion 45, a printing-paper pixel counting portion 46, a dot pixel judging portion (class identifying portion) 47, an area coverage modulation pixel judgment threshold setting portion (class identifying portion) 48, and an original identifying portion (class identifying portion) 49.

The minimum density value calculating portion 31 calculates a minimum density value for a block composed of a plurality of pixels including a single pixel of interest (center pixel). The maximum density value calculating portion 32 calculates a maximum density value for the block. The maximum density difference calculating portion 33 calculates, on the basis of the minimum and maximum density values obtained by calculation in the minimum density value calculating portion 31 and the maximum density value calculating portion 32, a maximum density difference for the block. The aggregate density complicatedness degree calculating portion 34 calculates the sum total of absolute values of difference in density between the adjacent pixels in the block.

In the determination region setting portion 35, a comparison is made between the maximum density difference calculated by the maximum density difference calculating portion 33 and a first maximum density difference threshold THd1 provided from the maximum density difference threshold setting portion 36, and also a comparison is made between the aggregate density complicatedness degree calculated by the aggregate density complicatedness degree calculating portion 34 and a first aggregate density complicatedness degree threshold THb1 provided from the aggregate density complicatedness degree threshold setting portion 37. In this way, it is determined whether the center pixel of the block belongs to the ground region/printing paper (photograph) region group or the character region/dot region group.

Moreover, in the determination region setting portion 35, a comparison is made between the maximum density difference calculated by the maximum density difference calculating portion 33 and a second maximum density difference threshold THd2 (THd1>THd2) provided from the maximum density difference threshold setting portion 36, and also a comparison is made between the aggregate density complicatedness degree calculated by the aggregate density complicatedness degree calculating portion 34 and a second aggregate density complicatedness degree threshold THb2 (THb1>THb2) provided from the aggregate density complicatedness degree threshold setting portion 37. In this way, for the block, a determination is made as to whether or not the following conditions are fulfilled: the maximum density difference is greater than or equal to the second maximum density difference threshold THd2; and the aggregate density complicatedness degree is greater than or equal to the second aggregate density complicatedness degree threshold THb2.

The center pixel is subjected to the determination process using the first maximum density difference threshold THd1 and the first aggregate density complicatedness degree threshold THb1 and the determination process using the second maximum density difference threshold THd2 and the second aggregate density complicatedness degree threshold THb2 successively. That is, in the automatic original type discriminating section 13, a determination as to which of the regions a single center pixel belongs to is made on the basis of the threshold values of two kinds: the maximum density difference threshold and the aggregate density complicatedness degree threshold. Moreover, in keeping with the sequential shift of the center pixel, the region for the block including the center pixel is shifted one after another. Various operations involved in those determination processes are under the control of the CPU.

The maximum density difference threshold setting portion 36 specifies the first maximum density difference threshold THd1 and the second maximum density difference threshold THd2 (THd1>THd2). The first maximum density difference threshold THd1 is used to determine whether the center pixel belongs to the ground region/printing paper photograph region group or the character region/dot region group on the basis of the maximum density difference calculated by the maximum density difference calculating portion 33. The second maximum density difference threshold THd2 is used to determine whether the center pixel is the second area coverage modulation pixel or not. The first maximum density difference threshold THd1 and the second maximum density difference threshold THd2 are used in the determination region setting portion 35.

The aggregate density complicatedness degree threshold setting portion 37 specifies the first aggregate density complicatedness degree threshold THb1 and the second aggregate density complicatedness degree threshold THb2 (THb1>THb2). The first aggregate density complicatedness degree threshold THb1 is used to determine whether the center pixel belongs to the ground region/printing paper region group or the character region/dot region group on the basis of the aggregate density complicatedness degree calculated by the aggregate density complicatedness degree calculating portion 34. The second aggregate density complicatedness degree threshold THb2 is used to determine whether the center pixel is the second area coverage modulation pixel or not. The first aggregate density complicatedness degree threshold THb1 and the second aggregate density complicatedness degree threshold THb2 are used in the determination region setting portion 35.

The second maximum density difference threshold THd2 and the second aggregate density complicatedness degree threshold THb2 are specified, with reference to, for example, a threshold value for detecting a pixel belonging to the printing paper photograph region, so as to extract pixels characteristic of the area coverage modulation pixel region in a wider range; that is, to extract not only dot pixels used in dot printing (the first area coverage modulation pixel) but also gradation reproduction pixels processed by means of error diffusion, dithering, or line-pattern representation (the second area coverage modulation pixel). Examples of an image of pixels belonging to the area coverage modulation pixel region include an image composed of dots, a line-pattern image composed of regularly and closely arranged parallel line segments, an image formed by means of error diffusion, an image formed by means of pixel distribution, an image formed by means of dithering, and an image formed by a density pattern method; that is, a binary or multi-level image in which halftone representation is achieved by exploiting area variation.

The character/dot judging portion 38 determines whether a pixel, which has been determined to belong to the character/dot region by the determination region setting portion 35, belongs to the character region or the dot region (the first area coverage modulation pixel). The character/dot judgment threshold setting portion 40 specifies a character/dot judgment threshold value for the judgment process effected by the character/dot judging portion 38.

The ground/printing paper judging portion 39 determines whether a pixel, which has been determined to belong to the ground region/printing paper region group by the determination region setting portion 35, belongs to the ground region or the printing paper region (the printing paper photograph region, continuous tone region). The ground/printing paper judgment threshold setting portion 41 specifies a ground/printing paper judgment threshold value for the judgment process effected by the ground/printing paper judging portion 39.

The second area coverage modulation pixel extracting portion 42 is composed of a pixel extracting portion (second area coverage modulation pixel detecting portion) 51, a correcting portion 52, and a pixel counting portion 53. In the pixel extracting portion 51, for the center pixel included in the block which has been determined to fulfill the conditions where the maximum density difference is greater than or equal to the second maximum density difference threshold THd2 and the aggregate density complicatedness degree is greater than or equal to the second aggregate density complicatedness degree threshold THb2, a comparison is made between a value obtained by multiplying the maximum density difference by the character/dot judgment threshold value and the aggregate density complicatedness degree. Then, the center pixel included in the block which has been determined to fulfill the condition where the aggregate density complicatedness degree is greater than or equal to the value of the maximum density difference×the character/dot judgment threshold is extracted as the second area coverage modulation pixel.

The correcting portion 52 performs correction processing in such a way that, out of the pixels which have been determined to belong to neither the character region nor the dot region in the judgment process using the second maximum density difference threshold THd2 and the second aggregate density complicatedness degree threshold THb2 by the determination region setting portion 35, or, out of the pixels which have not been extracted as the second area coverage modulation pixels in the pixel extracting portion 51 (target pixels), the one that can be regarded as the second area coverage modulation pixel is definable as a second tone pixel. With the target pixel defined as the center pixel, the propriety of this correction processing is decided by seeing the result of judgment as to its neighboring pixels.

The pixel counting portion 53 counts the number of pixels which have been judged as the second area coverage modulation pixels (including the number of pixels which have been regarded as the second area coverage modulation pixels) by the pixel extracting portion 51 and the correcting portion 52.

The character pixel counting portion 43 counts the number of pixels which have been determined to belong to the character region by the character/dot judging portion 38.

The dot pixel counting portion 44 counts the number of pixels which have been determined to belong to the dot region (the first area coverage modulation pixels) by the character/dot judging portion 38.

The ground pixel counting portion 45 counts the number of pixels which have been determined to belong to the ground region by the ground/printing paper judging portion 39.

The printing-paper pixel counting portion 46 counts the number of pixels which have been determined to belong to the printing paper photograph region by the ground/printing paper judging portion 39. Note that these count values are each the total sum of the number of relevant pixels with respect to an original image as a whole.

In the dot pixel judging portion 47, a comparison is made between the count result as to the pixels belonging to the dot region (the first area coverage modulation pixels) produced by the dot pixel counting portion 44 as well as the count result as to the second area coverage modulation pixels produced by the pixel counting portion 53 of the second area coverage modulation pixel extracting portion 42 and an area coverage modulation pixel judgment threshold provided from the area coverage modulation pixel judgment threshold setting portion 48. In this way, it is judged whether or not the dot pixel (the first area coverage modulation pixel) is included in the original image. The area coverage modulation pixel judgment threshold setting portion 48 specifies an area coverage modulation pixel judgment threshold to be used in the dot pixel judging portion 47.

The original identifying portion 49 determines the type of an original read off by the color image input unit 2 on the basis of the pixel-number count results and determination results produced by the character pixel counting portion 43, the ground pixel counting portion 45, the printing-paper pixel counting portion 46, and the dot pixel judging portion 47.

FIGS. 3 through 6 are graphs each showing an examples of pixel density distribution as observed in the ground region, the dot region, the printing paper photograph region, and the character region, respectively. FIG. 7 is a view showing distribution of the ground region, the dot region, the printing paper photograph region, and the character region based on the maximum density difference and the aggregate density complicatedness degree as indicia. In FIGS. 3 through 6, the location is taken along the horizontal axis, and the density is taken along the vertical axis. In FIG. 7, the maximum density difference is taken along the horizontal axis, and the aggregate density complicatedness degree is taken along the vertical axis. In regard to the relationship between the aggregate density complicatedness degree and the maximum density difference shown in FIG. 7, it never occurs that the aggregate density complicatedness degree is smaller than or equal to the maximum density difference. In FIG. 7, the region corresponding to the following relation: the maximum density difference=the aggregate density complicatedness degree or below is defined as a pixel-absent region.

Figure 3:
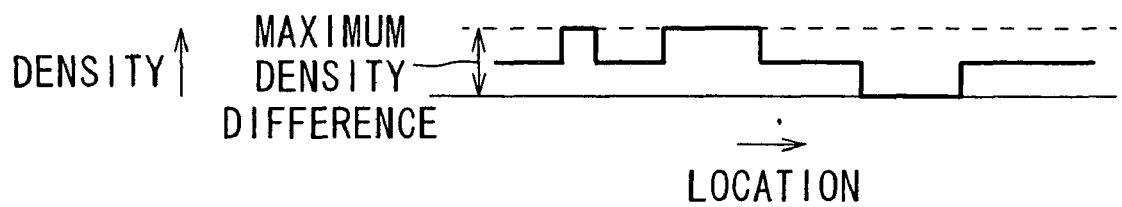
FIG. 3 is a graph showing an example of pixel density distribution as observed in a ground region.

As shown in FIG. 3, in general, the ground region exhibits a low degree of density variation. Therefore, both the maximum density difference and the aggregate density complicatedness degree take on very small values, and the range of distribution of the ground region conforms to a region A shown in FIG. 7. Accordingly, a pixel determined to belong to the ground/printing paper region and included in the block determined to fulfill the condition where the maximum density difference is smaller than the ground/printing paper judgment threshold (center pixel) can be judged as a ground pixel.

Figure 4:
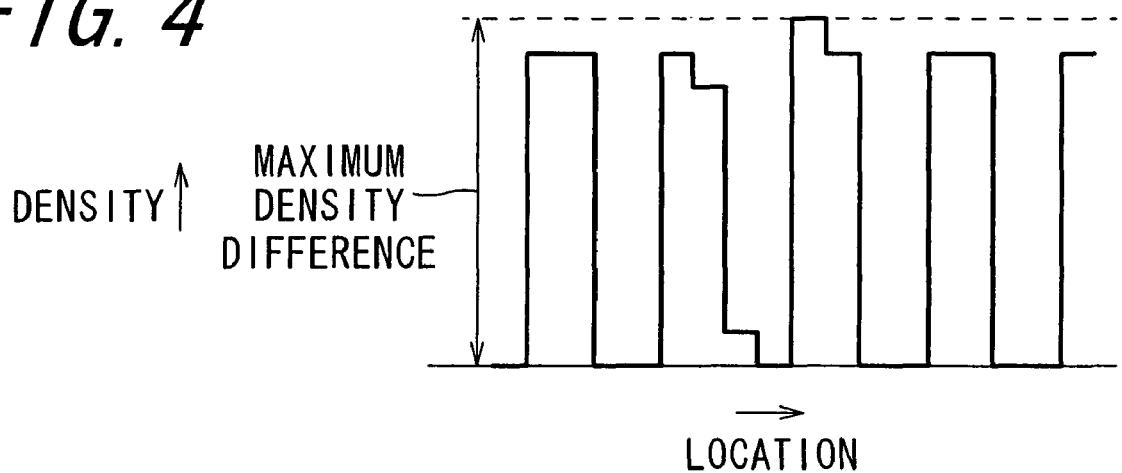
FIG. 4 is a graph showing an example of pixel density distribution as observed in a dot region.

As shown in FIG. 4, in general, the printing paper photograph region exhibits smooth density variation. Both the maximum density difference and the aggregate density complicatedness degree take on small values, but they are somewhat larger than those of the ground region. Therefore, the range of distribution of the printing paper photograph region conforms to a region B shown in FIG. 7. Accordingly, a pixel determined to belong to the ground region/printing paper region group and included in the block determined to fulfill the condition where the maximum density difference is larger than the ground/printing paper judgment threshold (center pixel) can be determined to belong to the printing paper region.

Figure 5:
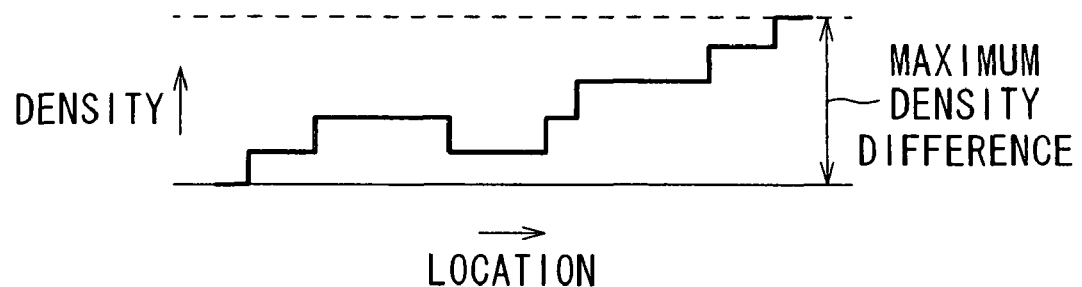
FIG. 5 is a graph showing an example of pixel density distribution as observed in a printing paper photograph region.

As shown in FIG. 5, in the dot region, while the maximum density difference varies according to a dot, density variation depends upon the number of dots. Therefore, the ratio of the aggregate density complicatedness degree to the maximum density difference is increased, and the range of distribution of the dot region conforms to a region D shown in FIG. 7. Accordingly, a pixel determined to belong to the character/dot region and included in the block determined to fulfill the condition where the aggregate density complicatedness degree is larger than the product of the maximum density difference and the character/dot judgment threshold (center pixel) can be determined to belong to the dot region.

Figure 6:
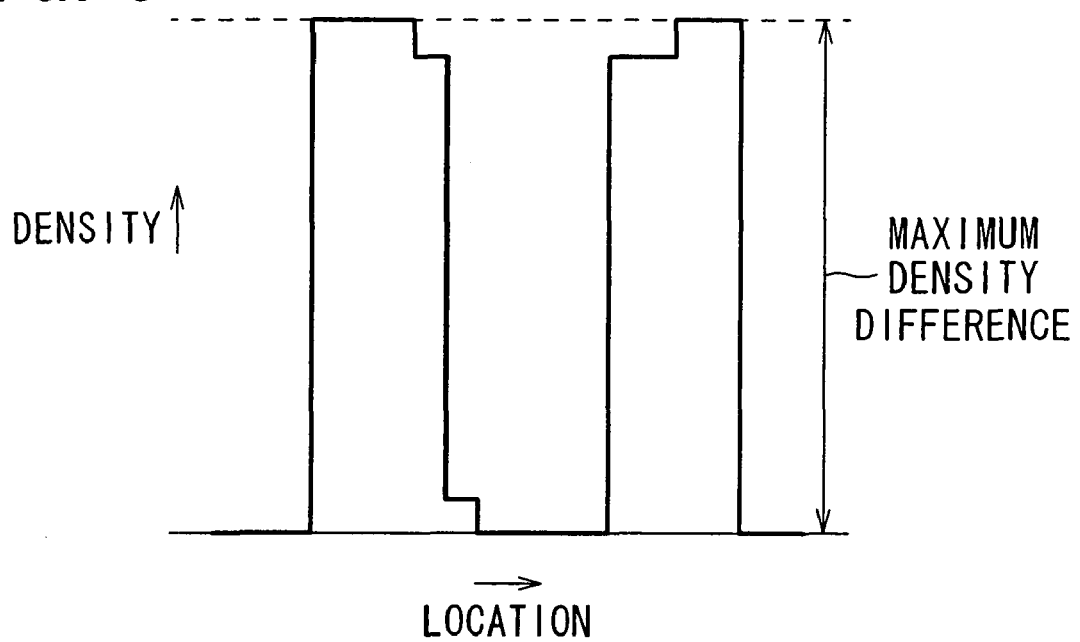
FIG. 6 is a graph showing an example of pixel density distribution as observed in a character region.
Figure 7:
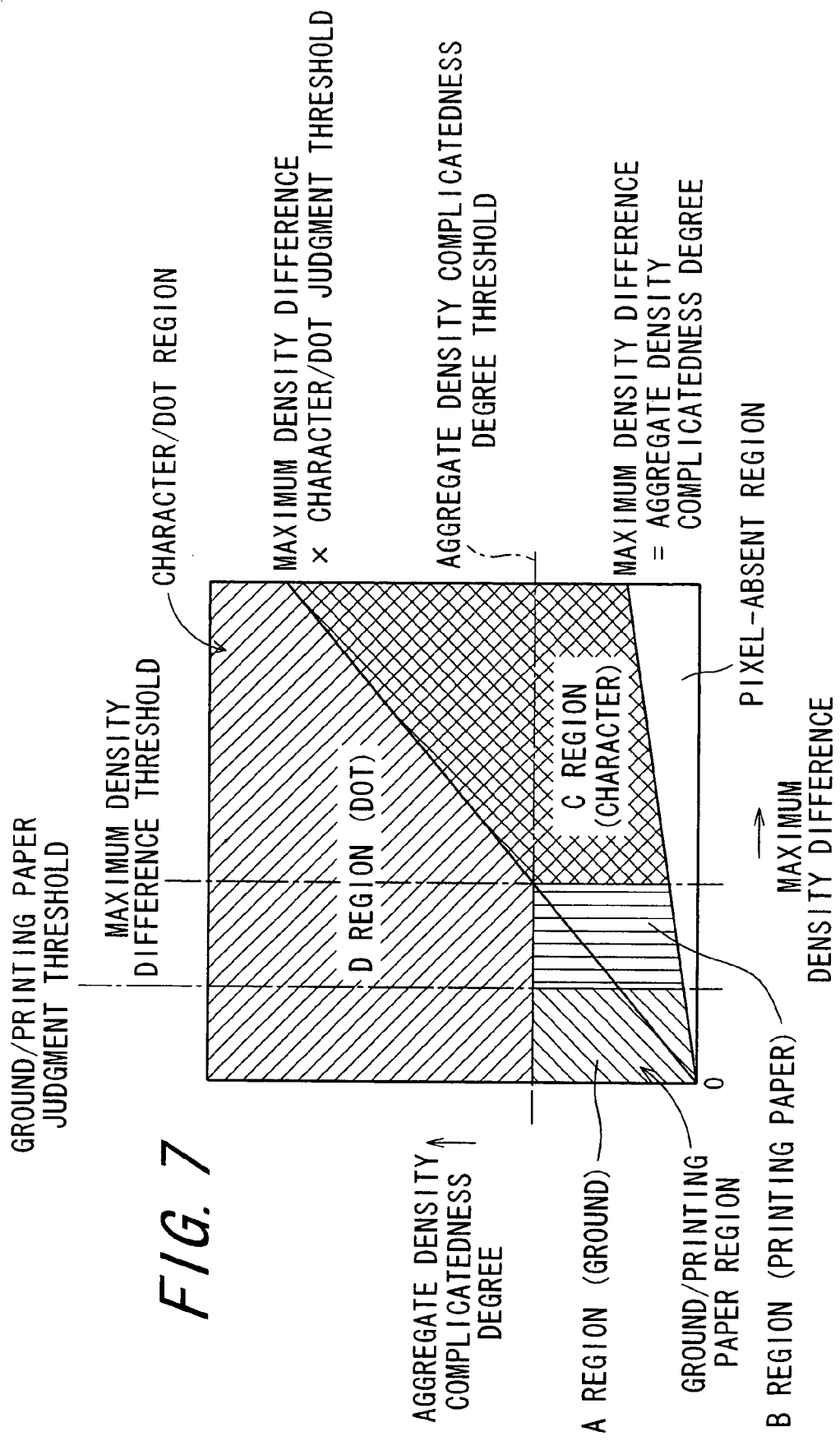
FIG. 7 is a view showing distribution of the ground region, the dot region, the printing paper photograph region, and the character region based on a maximum density difference and an aggregate density complicatedness degree as indicia.

As shown in FIG. 6, in the character region, the maximum density difference is great and the aggregate density complicatedness degree is high correspondingly. However, the degree of its density variation is lower than that of the dot region, wherefore the character region is smaller in aggregate density complicatedness degree than the dot region. Especially, the ratio of the aggregate density complicatedness degree to the maximum density difference is decreased, and thus the range of distribution of the character region conforms to a region C shown in FIG. 7. Accordingly, a pixel determined to belong to the character/dot region and included in the block determined to fulfill the condition where the aggregate density complicatedness degree is smaller than the product of the maximum density difference and the character/dot judgment threshold (center pixel) can be determined to belong to the character region.

As has already been described, the ground region and the printing paper photograph region are smaller in maximum density difference and aggregate density complicatedness degree than the character region and the dot region. Therefore, a comparison is made between the maximum density difference and the maximum density difference threshold value (the first maximum density difference threshold THd1), and also a comparison is made between the aggregate density complicatedness degree and the aggregate density complicatedness degree threshold value (the first aggregate density complicatedness degree threshold THb1). In this way, in the determination region setting portion 35, a determination can be made as to whether the center pixel belongs to the ground/printing paper region or the character/dot region.

Figures 8, 9:
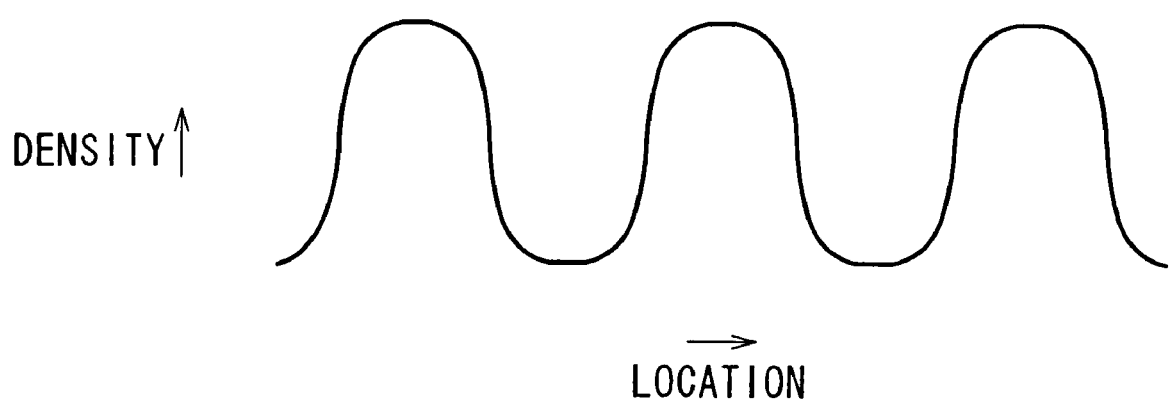
FIG. 8 is an illustrative view showing density values for pixels adjacent to 1-dot pixel (1 dot) in a region including first area coverage modulation pixels (dots)
FIG. 9 is an illustrative view showing density variation as observed in the region including the first area coverage modulation pixel.
Figures 10, 11:
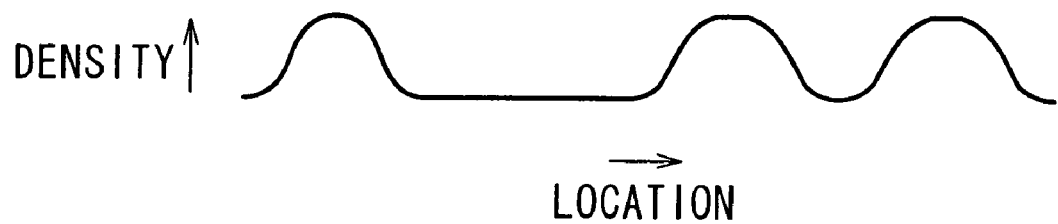
FIG. 10 is an illustrative view showing density values for pixels adjacent to 1-dot pixel in a region including second area coverage modulation pixels.
FIG. 11 is an illustrative view showing density variation as observed in the region including the second area coverage modulation pixel.
Figure 12:
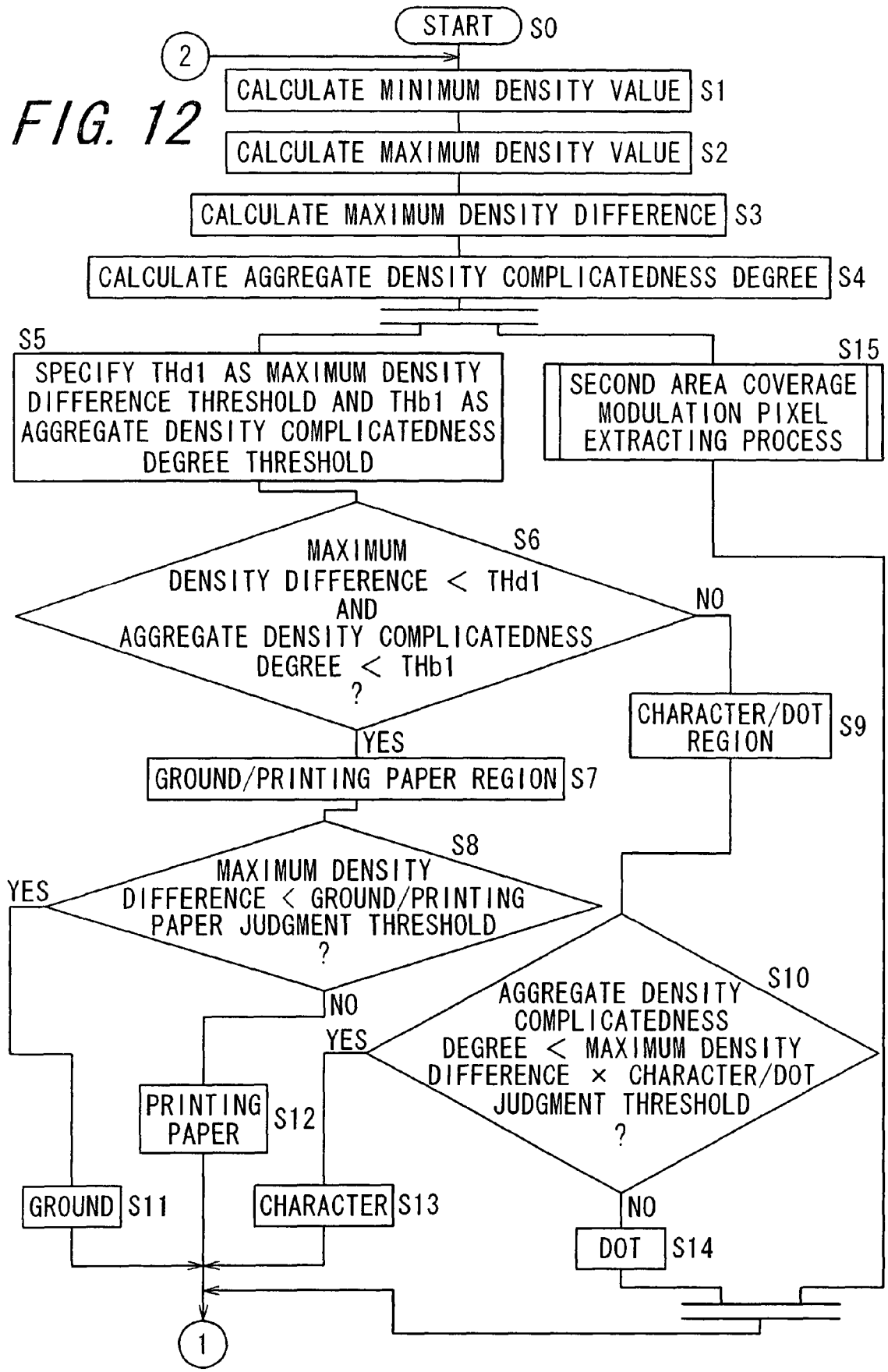
FIG. 12 is a flow chart showing procedural steps followed to perform an original type identification process in the automatic original type discriminating section.

Next, a description will be given below as to the first area coverage modulation pixel and the second area coverage modulation pixel. FIG. 8 is an illustrative view showing density values for the pixels adjacent to 1-dot pixel (1 dot) in the region including the first are a coverage modulation pixels (dots). FIG. 9 is an illustrative view showing density variation as observed in the region including the first area coverage modulation pixel. Similarly, FIG. 10 is an illustrative view showing density values for the pixels adjacent to 1-dot pixel in the region including the second area coverage modulation pixels. FIG. 11 is an illustrative view showing density variation as observed in the region including the second area coverage modulation pixel. In FIGS. 9 and 10, the location is taken along the horizontal axis, and the density is taken along the vertical axis. Moreover, in FIGS. 8 and 10, dot density values are expressed in 0 to 6 levels. The level "0" refers to the minimum density value (white: ground surface) and the level "5" refers to the maximum density value.

In the presence of dots used in dot printing (the first area coverage modulation pixels), a gradation is represented clearly, and a printed matter-matched dot line number is selected for use. Accordingly, as shown in FIGS. 8 and 9, in a dot-printed original, the dot density is high and the dots are arranged substantially equidistantly.

On the other hand, in regard to an image produced by an ink jet printing-type image forming apparatus (printer, copier, or multi-function machine), in most cases, halftone processing is achieved by means of error diffusion or a blue noise mask. In this case, as shown in FIGS. 10 and 11, the dots are spaced at irregular intervals. Furthermore, because of the use of a light-color ink or the like, the dot gradation is not so clear as in a dot-printed original. Moreover, in regard to an image produced by an electrophotographic printing-type image forming apparatus in widespread use, the higher is the resolution, the more likely it is that a clear dot will not be created readily. Also in this case, the gradation becomes unclear.

That is, there is a tendency that an original produced by an ink jet printing-type printer or an electrophotographic printing-type image forming apparatus (hereafter referred to as an "ink-jet printed or otherwise outputted original") is smaller in maximum density difference and aggregate density complicatedness degree than a dot-printed original. In light of this, by setting each of the threshold corresponding to the maximum density difference and that corresponding to the aggregate density complicatedness degree at a smaller value (the second maximum density difference threshold THd2 and the second aggregate density complicatedness degree threshold THb2, respectively), it is possible to extract area coverage modulation pixels for both of a dot-printed original and an ink-jet printed or otherwise outputted original (the first area coverage modulation pixel and the second area coverage modulation pixel). By way of contrast, by setting each of the thresholds at a larger value (the first maximum density difference threshold THd1 (THd1>THd2) and the first aggregate density complicatedness degree threshold THb1 (THb1>THb2), respectively), it is possible to extract area coverage modulation pixels for a dot-printed original alone (dots: the first area coverage modulation pixels).

Strictly speaking, in regard to an office document bearing a chart put out on ordinary paper by the ink jet printing method, as well as a photograph produced by a low-resolution to medium-resolution ink jet printing-type image forming apparatus, in a case where its image is low in density as a whole as a result of image formation effected with use of high-density dots (this will be explained in detail later), the chart or the photograph region thereof is judged as corresponding to a grid of dots. That is, even if dot region-related processing operations are performed thereon, no image quality degradation occurs. Accordingly, it may be understood that the first area coverage modulation pixel refers to a dot used in dot printing and to, of area coverage modulation pixels for halftone representation in an ink jet printing-type or electrophotographic printing-type image forming apparatus, the one which is, for example, characteristically equivalent to the dot. In the present embodiment, the dot and the pixel having such a characteristic are expressed as a "printing dot".

FIGS. 12 through 15 are flowcharts showing the procedural steps followed to perform an original type identification process in the automatic original type discriminating section 13.

Note that, in the following description, a block composed of a plurality of pixels including a center pixel is given as a block of n×m pixels (for example, n=15, m=15). The original type identification process starts a sequence of steps from Step S0, and the procedure proceeds to Step S1.

In Step S1, the minimum density value calculating portion 31 calculates a minimum density value for the n×m pixel block including the center pixel. Then, the procedure proceeds to Step S2.

In Step S2, the maximum density value calculating portion 32 calculates a maximum density value. Then, the procedure proceeds to Step S3.

In Step S3, the maximum density difference calculating portion 33 calculates a maximum density difference for the block on the basis of the minimum density value and the maximum density value obtained by calculation. Then, the procedure proceeds to Step S4.

In Step S4, on the one hand, the aggregate density complicatedness degree calculating portion 34 calculates the sum total of absolute values of difference in density between the adjacent pixels, namely an aggregate density complicatedness degree, for the block. The maximum density difference calculation process and the aggregate density complicatedness degree calculation process may be carried out either in a sequential manner or in a concurrent manner. Following the completion of Step S4, the procedure proceeds to Step S5.

In Step S5, the determination region setting portion 35 specifies THd1 as the maximum density difference value and THb1 as the aggregate density complicatedness degree threshold. Then, the procedure proceeds to Step S6.

In Step S6, a comparison is made between the maximum density difference calculated by the maximum density difference calculating portion 33 and the first maximum density difference threshold THd1 as well as the second maximum density difference threshold THd2, and also a comparison is made between the aggregate density complicatedness degree calculated by the aggregate density complicatedness degree calculating portion 34 and the first aggregate density complicatedness degree threshold THb1 as well as the second aggregate density complicatedness degree threshold THb2. In Step S6, when it is determined by the determination region setting portion 35 that the maximum density difference is smaller than the first maximum density difference threshold THd1 and that the aggregate density complicatedness degree is smaller than the first aggregate density complicatedness degree threshold THb1, then the procedure proceeds to Step S7.

In Step S7, the center pixel included in the block is determined to belong to the ground/printing paper region. Then, the procedure proceeds to Step S8.

In Step S8, the ground/printing paper judging portion 39 makes a comparison between the maximum density difference for the block including the center pixel and the ground/printing paper judgment threshold. When the result of the comparison made in Step S8 shows that the maximum density difference is smaller than the ground/printing paper judgment threshold, the procedure proceeds to Step S11. When the result of the comparison shows that the maximum density difference is larger than or equal to the ground/printing paper judgment threshold, the procedure proceeds to Step S12.

Figure 13:
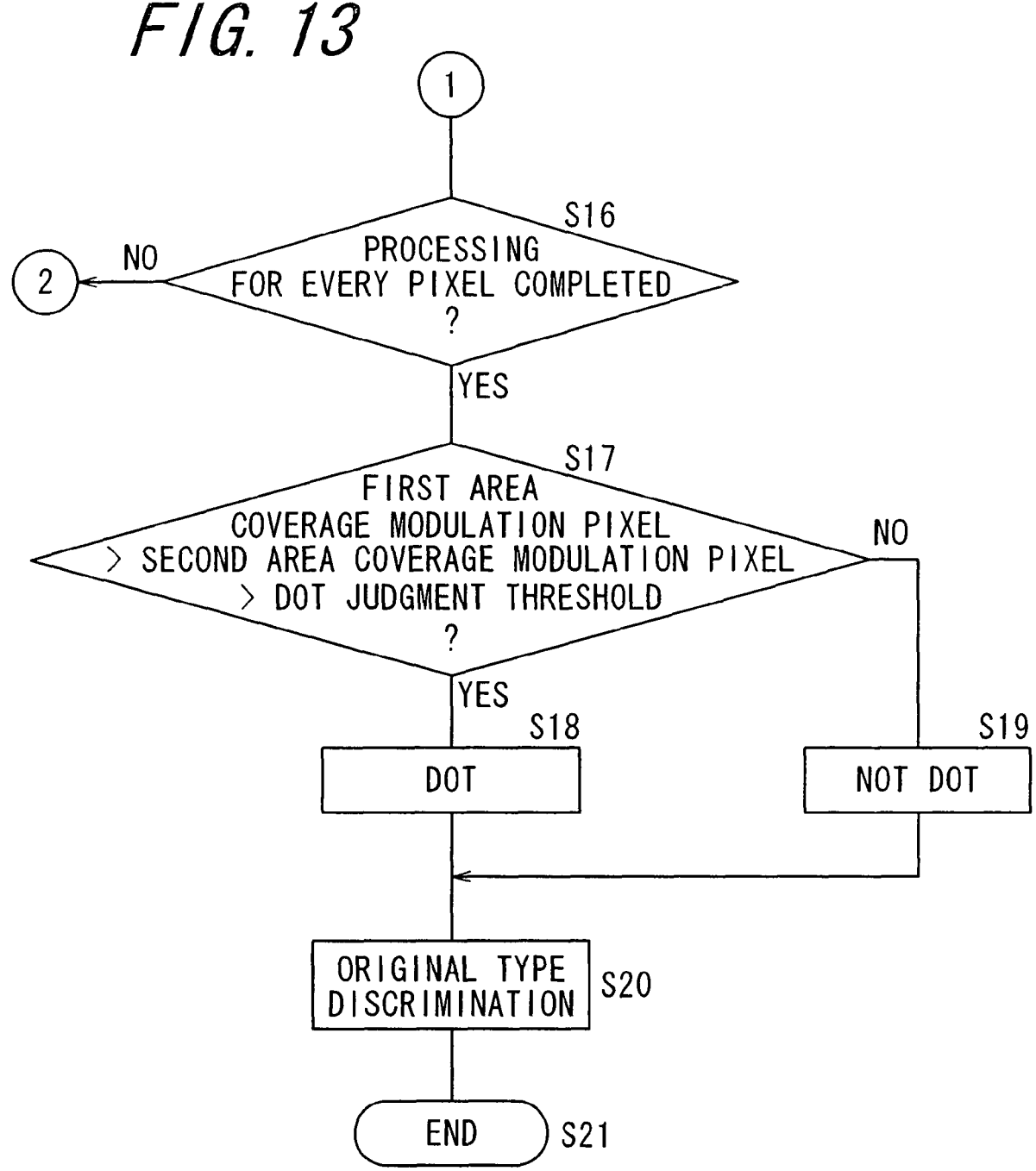
FIG. 13 is a flow chart showing the procedural steps followed to perform the original type identification process in the automatic original type discriminating section.

In Step S11, the center pixel is determined to belong to the ground region, and the procedure proceeds to Step S16 as shown in FIG. 13. In Step S12, the center pixel is determined to belong to the printing paper region, and the procedure proceeds to Step S16 as shown in FIG. 13.

Returning to Step S6 described above, when the prescribed conditions are not fulfilled, the procedure proceeds to Step S9. In Step S9, the center pixel is determined to belong to the character/dot region, and the procedure proceeds to Step S10. In Step S10, the character/dot judging portion 38 makes a comparison between a value obtained by multiplying the maximum density difference for the block including the center pixel by the character/dot judgment threshold and the aggregate density complicatedness degree. When the result of the comparison made in Step S10 shows that the aggregate density complicatedness degree is smaller than the value obtained by multiplying the maximum density difference for the block including the center pixel by the character/dot judgment threshold, the procedure proceeds to Step S13. When the result of the comparison shows that the aggregate density complicatedness degree is larger than or equal to the value obtained by multiplying the maximum density difference for the block including the center pixel by the character/dot judgment threshold, the procedure proceeds to Step S14.

In Step S13, the center pixel is determined to belong to the character region, and the procedure proceeds to Step S16 as shown in FIG. 13. In Step S14, the center pixel is determined to belong to the dot region, and the procedure proceeds to Step S16 as shown in FIG. 13.

Next, in Step S16, the automatic original type discriminating section 13 determines whether or not each and every pixel constituting the original image has undergone the determination process thus far described. When the determination result is "NO", the procedure returns to Step S1 and the succeeding processing steps will be repeated. When the determination result is "YES", the processing steps subsequent to Step S17 will be carried out.

Figure 14:
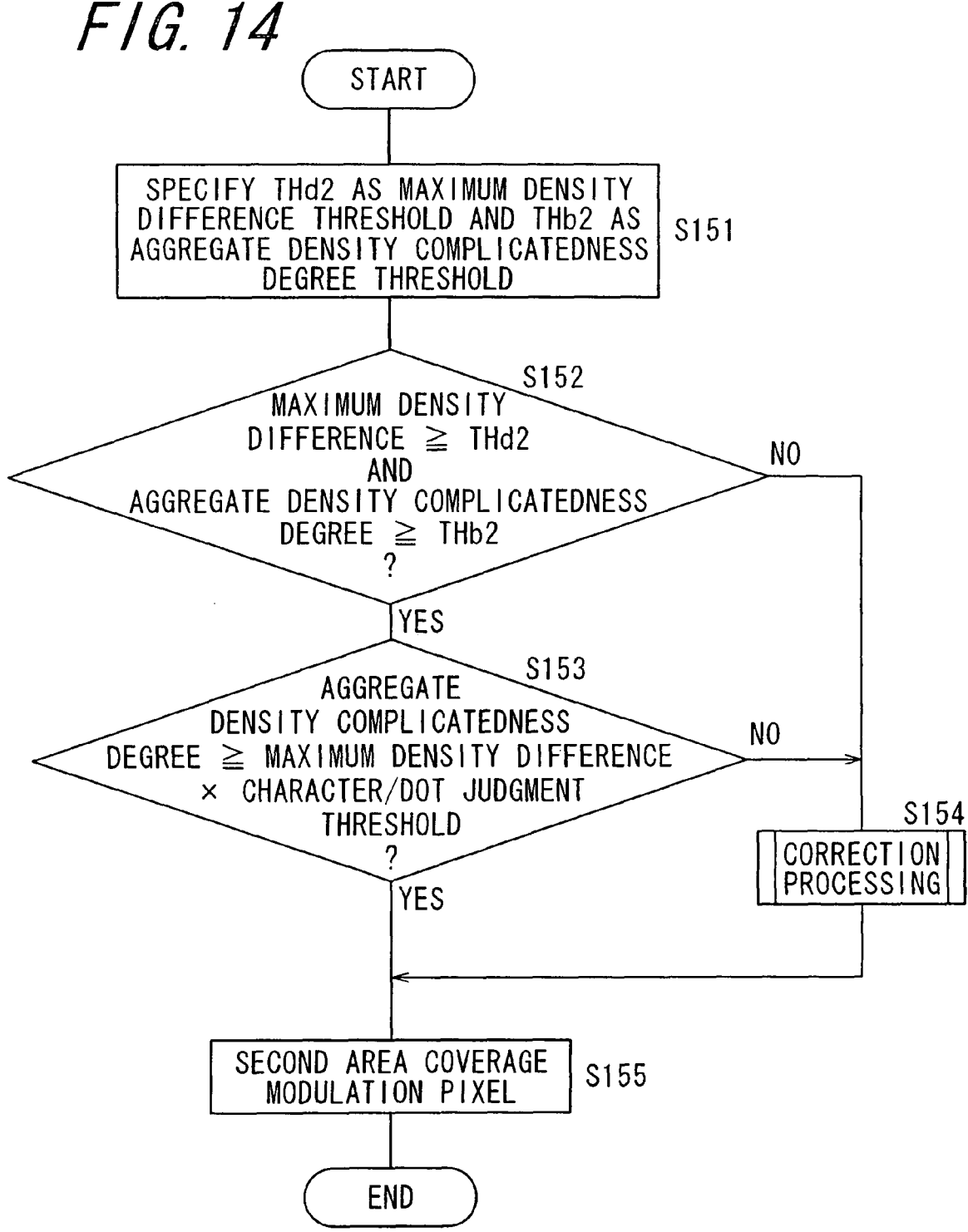
FIG. 14 is a flow chart showing the procedural steps followed to perform the original type identification process in the automatic original type discriminating section.

In the automatic original type discriminating section 13, on the other hand, in concurrent with the aforestated processing operations in Steps S5 through S14, the second area coverage modulation pixel extracting portion 42 performs a second area coverage modulation pixel extraction process in Step S15 (S15). FIG. 14 is a flow chart showing the procedural steps followed to perform the second area coverage modulation pixel extraction process in the second area coverage modulation pixel extracting portion 42.

Upon start-up of the second area coverage modulation pixel extraction process, the procedure proceeds to Step S151 wherein the determination region setting portion 35 specifies THd2 as the maximum density difference threshold and THb2 as the aggregate density complicatedness degree threshold. Then, the procedure proceeds to Step S152.

In Step S152, a comparison is made between the maximum density difference calculated by the maximum density difference calculating portion 33 and the second maximum density difference threshold THd2, and also a comparison is made between the aggregate density complicatedness degree calculated by the aggregate density complicatedness degree calculating portion 34 and the second aggregate density complicatedness degree threshold THb2.

When it is determined in Step S152 that the maximum density difference is greater than or equal to the second maximum density difference threshold THd2 and that the aggregate density complicatedness degree is greater than or equal to the second aggregate density complicatedness degree threshold THb2, then the procedure proceeds to Step S153.

In Step S153, in the pixel extracting portion 51 of the second area coverage modulation pixel extracting portion 42, for the block which has been determined to fulfill the conditions where the maximum density difference is greater than or equal to the second maximum density difference threshold THd2 and the aggregate density complicatedness degree is greater than or equal to the second aggregate density complicatedness degree threshold THb2, a comparison is made between a value obtained by multiplying the maximum density difference by the character/dot judgment threshold and the aggregate density complicatedness degree. When it is determined in Step S153 that the aggregate density complicatedness degree is greater than or equal to the value obtained by multiplying the maximum density difference by the character/dot judgment threshold, then the procedure proceeds to Step S155.

In Step S155, the center pixel included in the block is determined to belong to the second area coverage modulation pixel region, and the procedure proceeds to Step S16 as shown in FIG. 13.

When it is determined that the maximum density difference is smaller than the second maximum density difference threshold THd2 or that the aggregate density complicatedness degree is smaller than the second aggregate density complicatedness degree threshold THb2 in Step S152 described above, or when it is determined that the aggregate density complicatedness degree is smaller than the value of the maximum density difference×the character/dot judgment threshold in Step S153, then the procedure proceeds to Step S154.

In Step S154, the center pixel included in the block which has been determined to fulfill the condition where the maximum density difference is smaller than the second maximum density difference threshold THd2 or the aggregate density complicatedness degree is smaller than the second aggregate density complicatedness degree threshold THb2, or the center pixel included in the block which has been determined to fulfill the condition where the aggregate density complicatedness degree is smaller than the value of the maximum density difference×the character/dot judgment threshold, is defined as a candidate pixel for correction processing which is effected by the correcting portion 52. The candidate pixel is then subjected to the correction processing in an appropriate manner. Now, a description as to the correction processing will be given below with reference to the flow chart shown in FIG. 15 and to FIG. 16.

Figure 15:
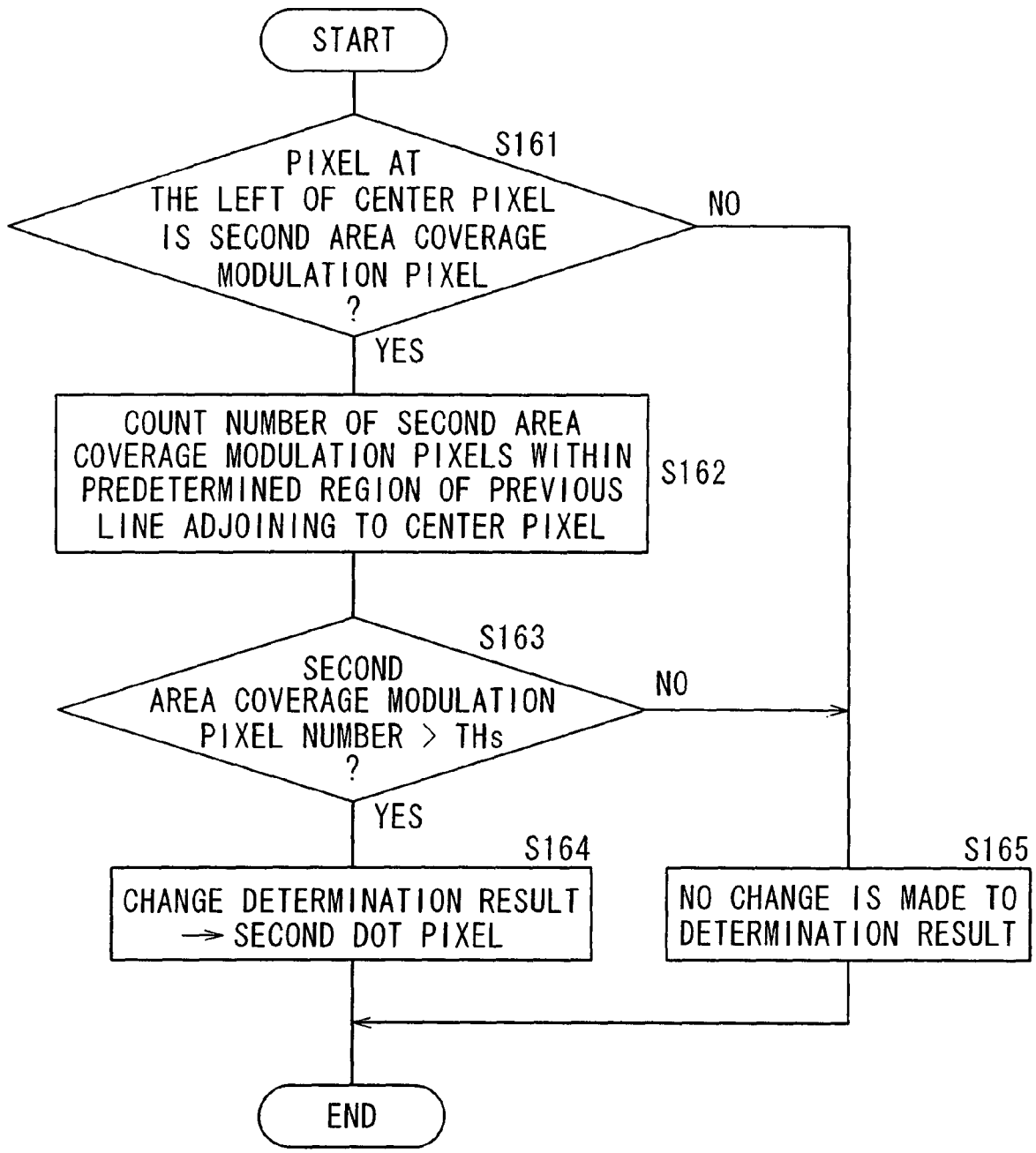
FIG. 15 is a flow chart showing the procedural steps followed to perform the original type identification process in the automatic original type discriminating section.
Figure 16:
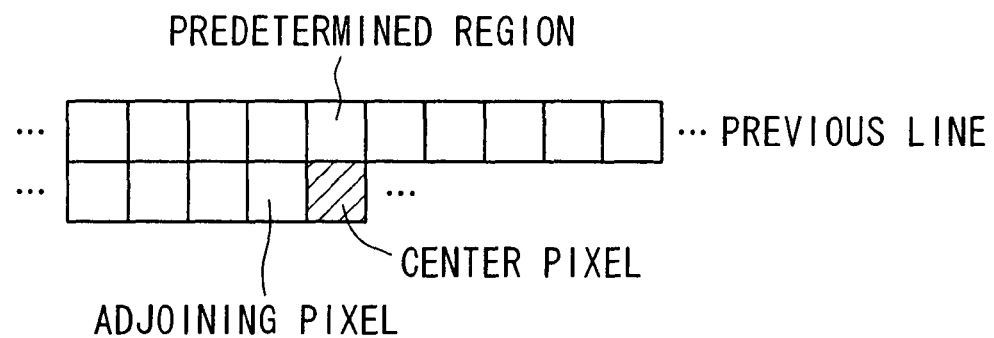
FIG. 16 is a view showing how pixels are arranged in image data.

FIG. 15 is a flow chart showing the procedural steps followed to perform the correction processing in Step S154 shown in the flow chart of FIG. 14. FIG. 16 is a view showing how pixels are arranged in image data. Upon start-up of the correction processing, the procedure proceeds to Step S161. At the outset, as shown in FIG. 16, it is determined whether or not a pixel adjacent to the center pixel on the left side is judged as the second area coverage modulation pixel. In regard to the image data shown in FIG. 16, the pixels are individually subjected to the processing one after another in a left-to-right manner. In this case, it is assumed that the pixel at the left of the center pixel has already undergone the processing. In a case where the same processing is performed on the pixels in a right-to-left manner, the reverse is true therewith. Moreover, the processing is performed in an upper pixel line-to-lower pixel line manner.

Following the completion of Step S161, the procedure proceeds to Step S162 wherein the pixel counting portion 53 counts the number of pixels judged as the second area coverage modulation pixels that are present within a predetermined region in the previous line adjoining to the center pixel. Then, the procedure proceeds to Step S163.

In Step S163, the dot pixel judging portion 47 makes a comparison between the count value obtained in Step S162 and a predetermined threshold THs. When the result of the comparison made in Step S163 shows that the number of the second area coverage modulation pixels is greater than or equal to the threshold THs, then the procedure proceeds to Step S164. When the result of the comparison shows that the number of the second area coverage modulation pixels is smaller than the threshold THs, then the procedure proceeds to Step S165.

In Step S164, the determination result as to the center pixel is so changed that it conforms to the second area coverage modulation pixel, and the correction processing is brought to an end. Then, the procedure proceeds to Step S155 shown in FIG. 14.

In Step S165, the correction processing is brought to an end without making any change to the determination result as to the center pixel. Then, the procedure proceeds to Step S155 shown in FIG. 14.

The predetermined region in the previous line is so selected as to include a pixel adjacent to the center pixel. For example, the region is set to be a region of approximately 10 pixels. In accompaniment with the sequential shift of the pixels to be defined as the center pixel, the predetermined region is shifted in the corresponding direction. Note that, given the predetermined region of the approx. 10-pixel region, then the threshold THs is set at 3, for example.

As has already been described, in the second area coverage modulation pixel extracting portion 42, a comparison is made between the maximum density difference and the second maximum density difference threshold, and also a comparison is made between the aggregate density complicatedness degree and the second aggregate density complicatedness degree threshold as well as the value of the maximum density difference×the character/dot judgment threshold. In this way, a pixel having a characteristic amount specific to the area coverage modulation pixel is extracted as the second area coverage modulation pixel. Moreover, out of the pixels determined to lack the characteristic amount specific to the area coverage modulation pixel, the one that can be regarded as the second area coverage modulation pixel based on the data on the predetermined region (the determination result as to the adjoining pixels with respect to the center pixel) is added as the second area coverage modulation pixel.

Note that, in the processing effected by the second area coverage modulation pixel extracting portion 42 in Step S153, although the value of the maximum density difference× the character/dot judgment threshold used in Step S10 is used for determination, the invention is not limited thereto and thus a different value may be newly specified for use. For example, it is possible to use a value smaller than that used in Step S10. To be more specific, given the value used in Step S10 of 6, then the value used in Step S153 may be set at 4.

Next, a description will be given below as to the determination operations effected in the dot pixel judging portion 47. In Step S17 of the flow chart shown in FIG. 13, the dot pixel judging portion 47 determines, under the conditions where the count value for the first area coverage modulation pixel produced by the dot pixel counting portion 44 is Cs1, the count value for the second area coverage modulation pixel produced by the pixel counting portion 53 is Cs2, and the area coverage modulation pixel judgment threshold specified in the area coverage modulation pixel judgment threshold setting portion 48 is THs, whether the following formula (5) is satisfied or not:

$$Cs1/Cs2 > THs \qquad (5)$$

In Step S17, when it is determined that the formula (5) is satisfied, the procedure proceeds to Step S18. When it is determined that the formula (5) is not satisfied, the procedure proceeds to Step S19.

In Step S18, it is determined that printing dots are included in the original image, and the count value for the first area coverage modulation pixel is defined as a dot count value. Then, the procedure proceeds to Step S20.

In Step S19, it is determined that no printing dot is included in the original image, and the area coverage modulation pixel judgment threshold THs is set at, for example, 0.15. Then, the procedure proceeds to Step S20. The area coverage modulation pixel judgment threshold THs may be set at a given appropriate value in consideration of image samples of various kinds.

Next, the original type discrimination operations effected in the original identifying portion 49 will be described in detail. In Step S20 of the flow chat shown in FIG. 13, the original identifying portion 49 identifies the type of an original. In the original identifying portion 49, when it is determined in Step S18 by the dot pixel judging portion 47 that, as described above, the original image includes printing dots, for example, pixel discrimination is carried out with use of image data obtained by performing pre-scanning on the original. Then, the number of discriminated pixels is counted, and the count value is compared with the predetermined threshold values for the ground region, the printing paper region, the dot region, and the character region. In this way, a determination is made as to the type of the original as a whole. To be more specific, for example, in a case where the proportion of the character region and the proportion of the dot region are each greater than or equal to their respective threshold values, the original is judged as a character/dot printed original (character print photograph original). Moreover, in a case where detection accuracy in descending order is: the character region, the dot region, and the printing paper region, for example, given the proportion of the character region of 20% to 30% of the sum total of the number of pixels, then the original is judged as a character original; given the proportion of the dot region of 10% to 20% of the sum total of the number of pixels, then the original is judged as a dot-printed original (print photograph original); and given the proportion of the printing paper region of less than 10% of the sum total of the number of pixels, then the original is judged as a printing paper photograph original.

Moreover, in the original identifying portion 49, when it is determined in Step S19 by the dot pixel judging portion 47 that no printing dot is included in the original image, a comparison is made between the count value for the second area coverage modulation pixel and a predetermined threshold THs2. When the result of the comparison shows that the count value for the second area coverage modulation pixel is greater than or equal to the predetermined threshold THs2, the original image is judged as a specific ink-jet printed or otherwise outputted original. When the result of the comparison shows that the count value for the second area coverage modulation pixel is smaller than the threshold THs2, the original image is judged as being free of the area coverage modulation pixel region. In this way, on the basis of the proportion of the character region and the proportion of the printing paper photograph region, the discrimination of original type is effected. Note that, in setting the threshold THs2, for example, the proportion of the second area coverage modulation pixel region is prescribed as 20% of the sum total of the number of pixels in the original image.

Following the completion of the area determination process, the original identifying portion 49 produces output of a determination result. Then, the procedure proceeds to Step S22, whereupon the processing comes to an end.

Further, according to the present embodiment, in the original identifying portion 49, for example, original types are classified into the following categories: a character original, a character print photograph original, a print photograph original, a printing paper photograph original, a character printing paper photograph original, and a specific ink-jet printed or otherwise outputted original. Alternatively, original types may be classified into the following categories: a sheet of newspaper, a photograph, a map, and so forth. Note that original type discrimination may be achieved by using image data temporarily stored in a storage section such as a hard disk instead of by performing pre-scanning.

According to the configuration described heretofore, the dot pixel judging portion 47 determines whether printing dots are included in the original image or not by exploiting the ratio between the count result as to the first area coverage modulation pixel and the count result as to the second area coverage modulation pixel. However, instead of the ratio, it is also possible to exploit the result obtained by performing computation on the count result as to the first area coverage modulation pixel and the count result as to the second area coverage modulation pixel, such as the sum of the count results or the difference between the count results.

Moreover, although the image forming apparatus 1 of the present embodiment is designed to perform correction processing in Step S154, this correction processing does not necessarily have to be carried out. If the correction processing is omitted, in the case of determining the second area coverage modulation pixel on the basis of the maximum density difference and the aggregate density complicatedness degree thus calculated with use of the second maximum density difference threshold, the second aggregate density complicatedness degree threshold, and the value of the maximum density difference×the character/dot judgment threshold, the second area coverage modulation pixel is defined as a pixel having a characteristic amount specific to the area coverage modulation pixel. Then, the area coverage modulation pixel judgment threshold, which is specified in the area coverage modulation pixel judgment threshold setting portion 48 for use in the dot judgment process, is set to be as high as 0.30, for example.

Moreover, although the above description deals with the case where the automatic original type discriminating section 13 performs processing operations with use of the maximum density difference and the aggregate density complicatedness degree as the amounts of characteristics, the characteristic amount is not limited thereto but may be based on, for example, run length data or reversal frequency data. Further, in the heretofore illustrated example of the discrimination process, whether the center pixel belongs to the ground region/printing paper (photograph) region group or the character region/dot region group is determined first, and as a further step, whether the center pixel belongs to the character region or the dot region is determined. Instead whereof, it is also possible to achieve the discrimination process in a concurrent manner; that is, a determination as to which of the character region, the dot region, the printing paper region, and the ground region the center pixel belongs to is made in parallel. Note that the printing paper region and the ground region may be defined collectively as the rest region. It is thus essential only that at least a determination as to whether the center pixel is included in the dot region or not be made properly.

Following the completion of the original type discrimination process, on the basis of the determination result produced by the automatic original type discriminating section 13, downstream processing operations are effected successively in the input tone correcting section 14, the color correcting section 16, the black generation/under-color removal section 17, the modification region processing section 18, the spatial filtering processing section 19, and the tone reproduction processing section 21. Now, examples of how these processing operations are performed will be described below.

When it is determined by the automatic original type discriminating section 13 that the image data shows no signs of coexistence of a plurality of different regions, the input tone correcting section 14, the color correcting section 16, the black generation/under-color removal section 17, the modification region processing section 18, the spatial filtering processing section 19, and the tone reproduction processing section 21 perform their respective image data processing operations in such manners as described previously.

When it is determined by the automatic original type discriminating section 13 that the image data indicates coexistence of a plurality of different regions, a parameter intermediate those for the plural region-corresponding processing operations is used, but a parameter for the processing operations corresponding to a region which has not been recognized in the original type discrimination process is not used. To be more specific, for example, when the input image (original) is judged as a character original, in the input tone correction processing effected by the input tone correcting section 14, a correction curve such as to permit removal of a greater degree of highlights and intensification of contrast is used. Moreover, the color correcting section 16 performs chroma-oriented color correction processing on a chromatic color character, and the black generation/under-color removal section 17 performs black generation/under-color removal processing in such a manner that the degree of black generation becomes greater for a black character. Further, in the spatial filtering processing section 19, for a character, spatial filtering processing is performed to achieve edge emphasis, and the level of smoothing is lowered. To that end a parameter substitution, e.g. the setting of a filter coefficient is carried out properly. Still further, the tone reproduction processing section 21 performs halftone processing (dithering processing).

When it is determined by the automatic original type discriminating section 13 that the input image conforms to a character printing paper photograph original, in each of the processing operations, a parameter intermediate those for the character original-corresponding processing and the printing paper photograph original-corresponding processing is used. Depending upon which one of a character original and a printing paper photograph original is regarded as more important, the input tone correcting section 14 performs input tone correction processing for removing highlights and making contrast adjustment with use of a parameter intermediate those for the printing paper photograph original-corresponding processing and the character original-corresponding processing. Moreover, the color correcting section 16 performs color correction processing in such a manner that neither chroma intensity nor gradation balance will be adjusted extremely. Further, in the black generation/under-color removal processing effected by the black generation/under-color removal section 17, an adjustment to the degree of black generation is carried out within the bounds of not adversely affecting the printing paper photograph image.

In the present embodiment, in a case of reading an ink-jet printed original, original type discrimination is done in the following manner.

Case (1) An Office Document (Bearing a Chart and so Forth) Put Out on Ordinary Paper or the Like In a case where the chart or the like is composed solely of lines and characters, the original is identified as a "character original". In this case, the same processing operations as those for a character original such as a printed material can be performed without any problem.

In a case where a color drawing or the like is included, since the chart portion is recognized as a dot portion, the original is identified as a "character print original". By virtue of the smoothing processing performed on the chart portion recognized as a dot portion in order to prevent the generation of moire, the effect of preventing undesirable graininess can be produced, and thus no problem is presented.

An ink-jet printed original produced in ordinary-paper form is lacking in vividness as compared with the one produced in photography-specific paper form, and its output is produced in a dull-hued state. It is thus desirable to use a color correction table for printing use in performing the color correction processing.

Case (2) A Photograph Put Out on Photography-specific Paper by a High-resolution Ink Jet Printing-type Image Forming Apparatus When a photograph produced by a high-resolution (ca. 2880 dpi) ink jet printing-type image forming apparatus is scanned in by using a scanner (a unitized scanner or a scanner portion of a color copier) with a resolution of ca. 600 dpi, most of the pixels of the photograph cannot be read off as a matter of course. Accordingly, the original is identified as a "printing paper photograph original". Because of the pixel-reading incapable nature, there arises no graininess. In addition to that, a printing paper photograph and a photograph put out on photography-specific paper by means of ink jet printing are analogous to each other in terms of color reproduction range. There is thus no problem in performing the printing paper photograph-corresponding processing.

Case (3) A Photograph Produced by a Low-resolution to Medium-resolution Ink Jet Printing-type Image Forming Apparatus When a photograph produced by a low-resolution to medium-resolution (ca. 1200 dpi) ink jet printing-type image forming apparatus is scanned in by some means with a resolution of ca. 600 dpi, part of the pixels of the photograph can be read off. For example, in a low-density area of the original produced by the low-resolution to medium-resolution ink jet printing-type apparatus, the density of pixels is low; that is, the spacing between the adjacent pixels is large. Therefore, the presence or absence of pixels can be determined even in a low-resolution image reading apparatus. However, the higher is the pixel density, the more likely it is that the presence or absence of pixels will not be determined successfully, which results in difficulty in distinction from the printing paper region. In this case (3), further classification is made under the following three patterns:

(a) An Original Bearing an Image Formed by Using High-density Dots, in which the Image is Low in Density as a Whole (Dot-to-dot Spacing is Large)

In an image which is low in density as a whole, dots are scattered sparsely. Since the counting of the number of the area coverage modulation pixels (the number of the first and second area coverage modulation pixels) is done with respect to the whole area of the image, the original is identified as a "print photograph original (or character print photograph original)". In this case, an area judged as the dot region is subjected to smoothing processing in order to prevent the generation of moire. Moreover, since the image is low in density as a whole, there is no problem in performing the print photograph-corresponding color correction processing.

(b) An Original Bearing an Image which is High in Density as a Whole

In an image which is high in density as a whole, dots are scattered densely. Since hardly any area judged as having the area coverage modulation pixels (the first and second area coverage modulation pixels) is present, the original is identified as a "printing paper photograph original". Because of the impossibility of pixel reading for the image as a whole, no graininess arises, and thus no problem is presented.

(c) An Original Bearing an Image Formed by Using High-density Dots, in which the Image Includes Both a Low-density Area and a High-density Area Together, or an Original Bearing an Image Formed by Using Low-density Dots In this case, because of, in addition to the fewness of dots (the first area coverage modulation pixels), the coexistence of a high-density area and a low-density area in an image, depending upon the nature of the image, the original could be judged either as a print photograph original or as a printing paper photograph original. That is, the result of judgment on the original may vary, for example:

1. the result of judgment varies according to the orientation of the original (in portrait or landscape configurations);

2. where the original is obtained by reading, with a scanner, a somewhat-edited output produced by an ink jet printing-type image forming apparatus, the result of judgment varies greatly; and 3. there is no variation in the result of judgment in terms of the second area coverage modulation pixel by virtue of the correction processing, but the result of judgment varies greatly depending upon the first area coverage modulation pixel.

When the original is determined to be a print photograph original, although no graininess arises in the low-density area, the collapse of tones could be caused in the high-density area (both dark and vivid areas). On the other hand, when determined to be a printing paper photograph original, although no collapse of tones is caused in the high-density area, graininess could arise in the low-density area.

Occurrence of the aforestated phenomena is true of an image produced by an electrophotographic printing-type image forming apparatus in widespread use.

As described just above, in regard to an original which comes under the classification of (3)-(c), image quality degradation could be caused. Accordingly, by identifying such an original as a specific ink-jet printed or otherwise outputted original, it is possible for all of originals produced by means of ink jet printing and electrophotographic printing to be reproduced satisfactorily.

The specific ink-jet printed or otherwise outputted original is subjected to relevant processing operations in sequence in the constituent sections as follows.

(The Region Separation Processing Section)

The region separation processing is omitted. Alternatively, in order to prevent occurrence of image quality degradation caused by switching of processing methods as the result of the determination that the image includes both the dot-printed region and the printing paper region, a determination is made in such a manner that the entire area of the image is processed uniformly. For example, the entire area of the image is determined to be an ink jet print region or an electrophotographic print region.

(The Color Correcting Section)

Just as is the case with a printing paper photograph, conversion processing is performed in a manner so as to insure that no collapse of tones occurs in the high-density area. For example, the conversion processing may be performed with use of a color correction table for use with a printing paper photograph.

(The Black Generation/under-color Removal Section)

The degree of black generation and the degree of under-color removal are adjusted within the bounds of not causing any collapse of tones in the dark area.

(The Spatial Filtering Processing Section)

The filters for use are such as to perform enhancement processing in a low-frequency region and to perform smoothing processing in a high-frequency region. The level of emphasis in the enhancement processing is adjusted to be lower than that for a character original, and the level of smoothness in the smoothing processing is adjusted to be lower than that for a dot-printed photograph original.

(The Tone Reproduction Processing Section)

Just as is the case with a printing paper photograph original, gray scale-oriented tone reproduction processing is performed. For example, in the dithering processing, the size of the dither matrix is increased, whereas, in the error diffusion processing, the size of the diffusion matrix is increased.

In the above description, the method of original type discrimination has been illustrated. Instead of the original-type discrimination method, alternatively, it is possible to adopt a method to produce a control signal indicating that the image under processing is characterized in that the count value for the first area coverage modulation pixel against the count value for the second area coverage modulation pixel is smaller than or equal to the area coverage modulation pixel judgment threshold and that the count value for the second area coverage modulation pixel is larger than or equal to the threshold THs2. In this case, on the basis of the control signal, the downstream processing operations in the region separation processing section 15, the color correcting section 16, the black generation/under-color removal section 17, the spatial filtering processing section 19, and the tone reproduction processing section 21 are controlled properly.

The color image processing unit 3 is designed to perform the automatic original type discrimination process in such a manner that, instead of all of ink-jet printed or otherwise outputted originals (all of images produced by means of ink jet printing or electrophotographic printing), only ink-jet printed or otherwise outputted originals that cannot be reproduced successfully by a conventional original processing mode (specific ink-jet printed or otherwise outputted originals) are discriminated selectively. This makes it possible to attain higher original recognition accuracy and higher image quality than ever. Moreover, in effecting the discrimination process, two different threshold values are employed to identify the area coverage modulation pixel (the pixel for constituting the area coverage modulation image region), and the number of the first area coverage modulation pixels (dots) used only for a dot printed original and the number of the second area coverage modulation pixels included in a dot printed original and an ink-jet printed or otherwise outputted original are each counted. On the basis of these count results, threshold-based relevant processing operations are performed thereby to identify a specific print original. Further, in the color image processing unit 3, an original judged as a specific ink-jet printed or otherwise outputted original is not subjected to the region separation process, so that the entire area of the image is processed uniformly. This helps prevent image quality degradation.

Figure 17:
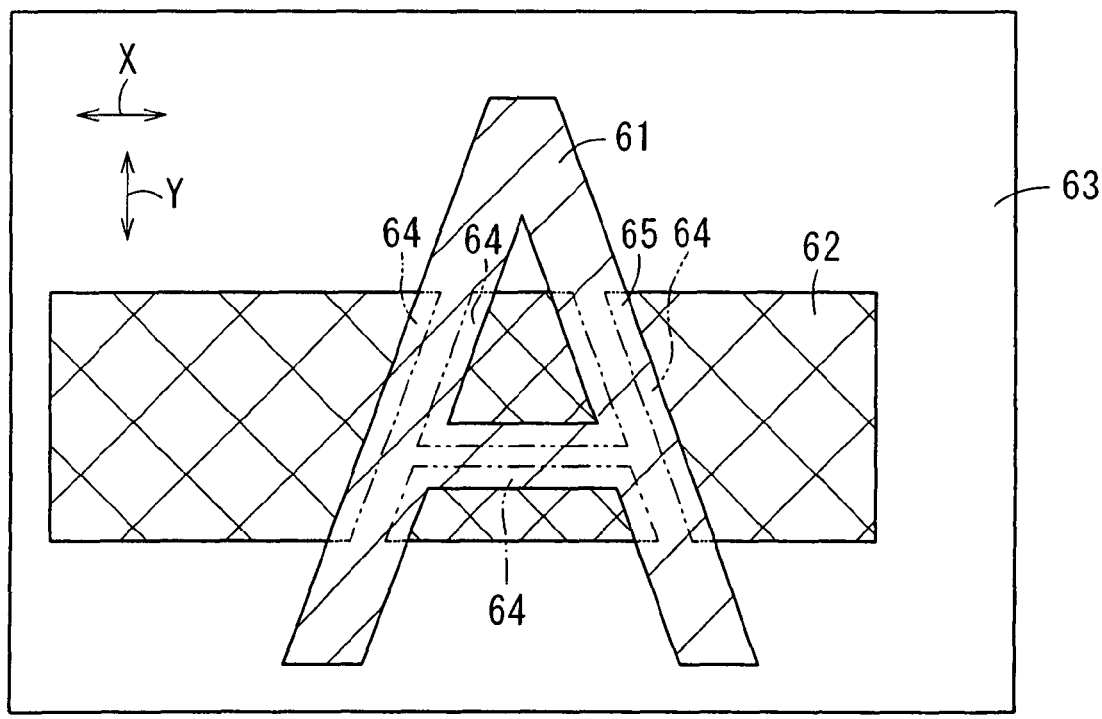
FIG. 17 is an explanatory view of processing operations which are effected in a modification region processing section.
Figure 18:
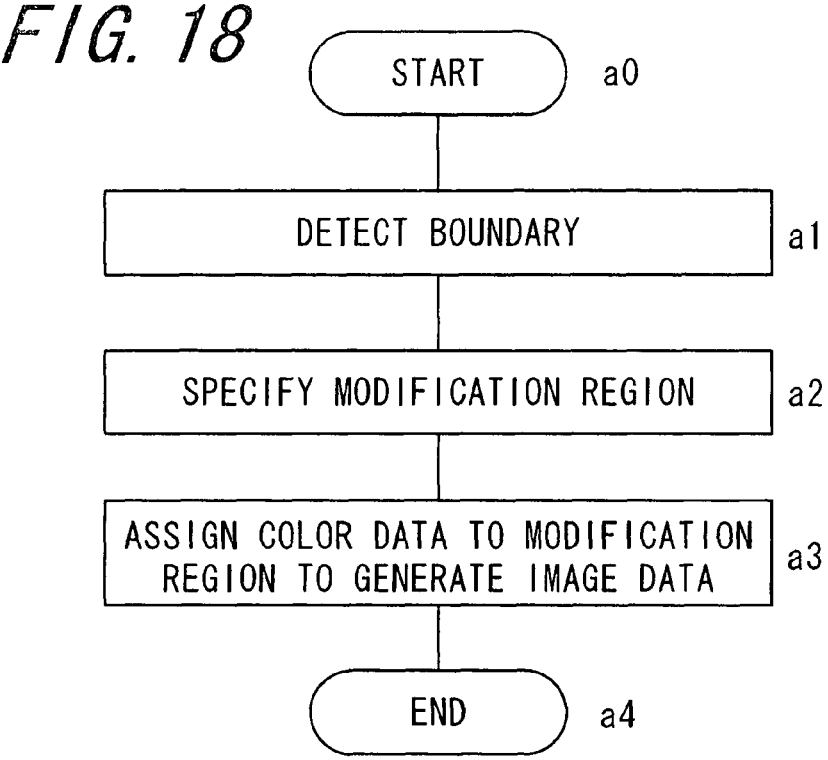
FIG. 18 is a flow chart showing procedural steps followed to perform region correction processing in the modification region processing section.
Figure 19:
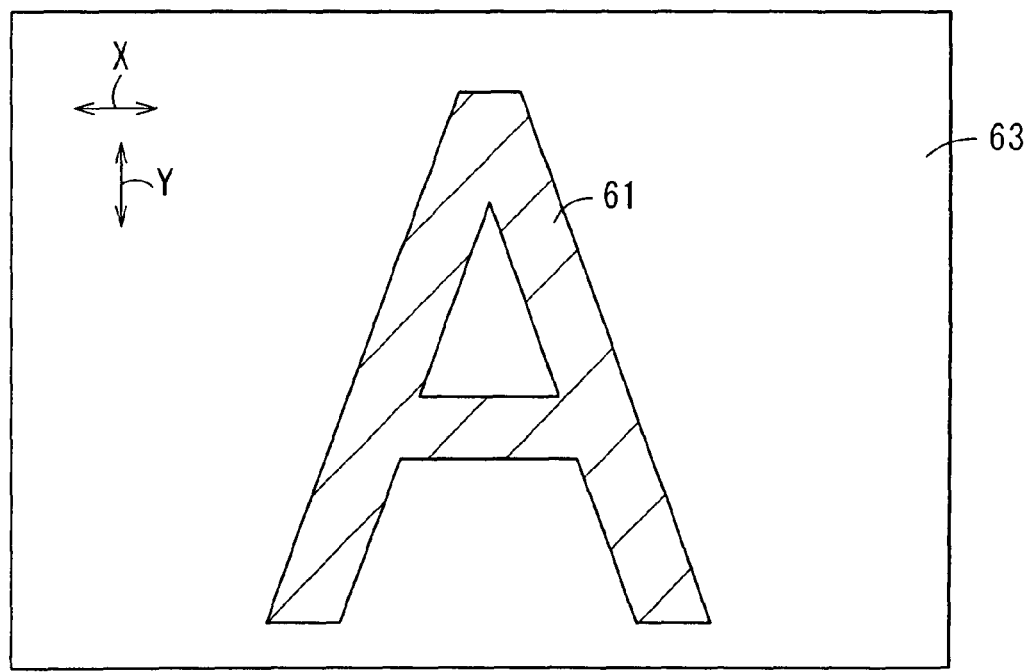
FIG. 19 is a view showing a state in which a character image corresponding to the character region is formed on a recording medium.

Next, the modification region processing section 18 will be explained. FIG. 17 is an explanatory view of the processing operations which are effected in the modification region processing section 18, illustrating a state in which image data including both the character region and the ground region in the form of an image is borne on a recording medium 63. FIG. 18 is a flow chart showing the procedural steps followed to perform region correction processing in the modification region processing section 18. FIG. 19 is a view showing a state in which a character image 61 corresponding to the character region is formed on the recording medium 63. FIG.

Figure 20:
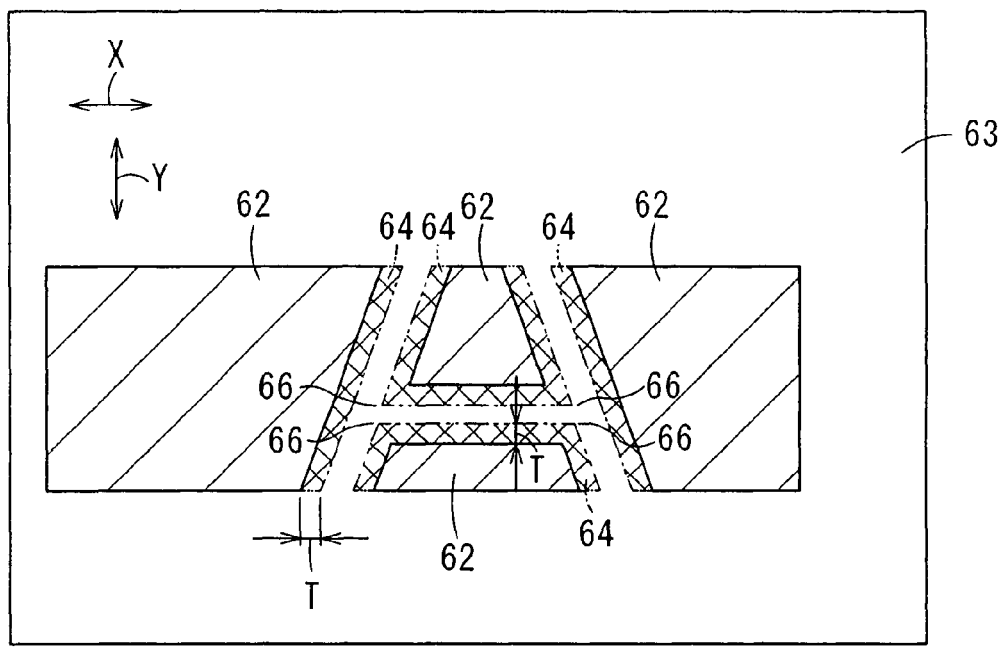
FIG. 20 is a view showing a state in which a ground image corresponding to the ground region and a modification image corresponding to the modification region are formed on a recording medium.
Figure 21:
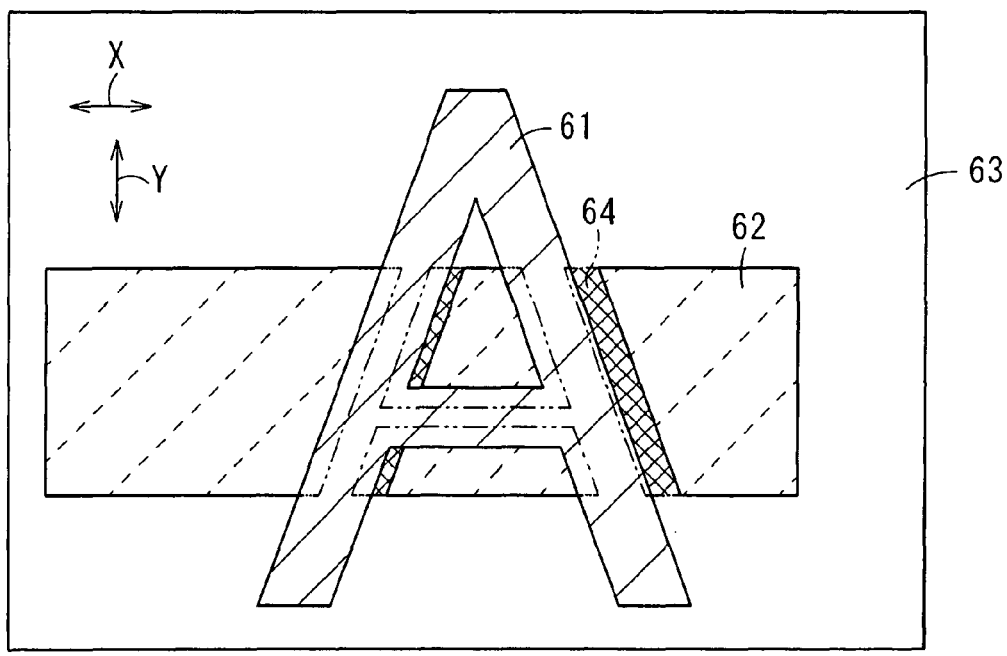
FIG. 21 is a view showing a state in which the character image corresponding to the character region, the ground image corresponding to the ground region, and the modification image corresponding to the modification region are formed on the recording medium.

20 is a view showing a state in which a ground image 62 corresponding to the ground region and a modification image 64 corresponding to the modification region are formed on the recording medium 63. FIG. 21 is a view showing a state in which the character image 61 corresponding to the character region, the ground image 62 corresponding to the ground region, and the modification image 64 corresponding to the modification region are formed on the recording medium 63. In each of FIGS. 17, 19, 20, and 21, its horizontal direction conforms to a main scanning direction X in which an image is formed on the recording medium 63 by the color image output unit, whereas its vertical direction conforms to a sub scanning direction Y in which an image is formed on the recording medium 63 by the color image output unit. In the present embodiment, the character region is assigned color data indicating a black color, and the UCR rate for the character region is set at 1. Therefore, the character image 61 is composed solely of the recording agent K. In FIG. 17, the character image 61 is represented by oblique lines, and the ground image 62 is represented by cross-hatching lines. Moreover, the ground region is assigned color data indicating CMY colors (except for K) and thus the ground image 62 is composed of one of or a plurality of the recording agents of CMY colors. Moreover, in FIG. 19, the character image 61 is represented by oblique lines, and, in FIG. 20, the ground image 62 is represented by oblique lines and the modification image 64 is represented by cross-hatching lines. Further, in FIG. 21, the character image 61 is represented by oblique lines, the ground image 62 is represented by broken lines, and the modification image 64 is represented by cross-hatching lines. Note that FIG. 17 shows a state in which neither of the images represented by the CMYK-corresponding image data, namely neither the character image 61 corresponding to the character region nor the ground image 62 corresponding to the ground region incurs misregistration. By way of contrast, FIG. 21 shows a state in which the images represented by the CMYK-corresponding image data, namely the character image 61 corresponding to the character region and the ground image 62 corresponding to the ground region incur misregistration.

Upon image data being provided from the black generation/under-color removal section 17, the procedure proceeds from Step a0 to Step a1. In Step a1, the modification region processing section 18 detects, out of the image represented by the image data, a first region and a second region. The first region is assigned first color data indicating a predetermined color so that is can be formed by using only one of the recording agents that corresponds to the predetermined one color. The second region, which is arranged adjacent to the first region, is assigned second color data indicating a color different from the predetermined color so that it can be formed by using a recording agent different from the recording agent for forming the first region. In the present embodiment, the first region refers to the character region, whereas the second region refers to the ground region which is a background against which the character region exists. In the modification region processing section 18, image data is provided, on a pixel-by-pixel basis, for each of the lines corresponding to the main scanning direction X from one side to the other side along the main scanning direction X consecutively, ditto for the sub scanning direction Y. The modification region processing section 18 detects, out of the image data, the location at which the region identification signal provided from the region separation processing section 15 changes from a ground region mode to a character region mode, as well as the location at which the region identification signal changes from the character region mode to the ground region mode, as the boundary between the ground region and the character region.

Next, the procedure proceeds to Step a2. On the basis of the result of detection as to the boundary between the ground region and the character region, the modification region processing section 18 specifies a third region which is continuous with the second region, namely the ground region and also overlaps with a part of a periphery of the first region, namely the character region which is contiguous to the second region (hereinafter, the third region will be referred to as a "modification region"). Following the completion of Step a2, the procedure proceeds to Step a3.

In Step a3, in the modification region processing section 18, the modification region is assigned color data indicating a color that can be represented by the recording agent for use in ground region formation thereby to generate image data. In the present embodiment, the color indicated by the third color data is set to be identical with the color indicated by the second color data; that is, the modification region is identical in color representation with the ground region. Following the completion of Step a3, the procedure proceeds to Step a4, whereupon the processing operation comes to an end.

With the processing operation thus far described, the modification region processing section 18 produces new CMYK signals by adding the modification region-corresponding color data to the CMYK signals provided from the black generation/under-color removal section 17.

In FIG. 17, a modification image 64 corresponding to the modification region is indicated by virtual lines. The modification image 64 is continuous with the ground image 62. As shown in FIG. 17, in a case where neither the character image 61 nor the ground image 62 incurs misregistration, the modification image 64 overlaps with a periphery 65 of the character image 61. Even if the modification image 64 and the character image 61 overlap each other in that way, in contrast to the case where part of the recording medium 63 is exposed between the character image 61 and the ground image 62, occurrence of image quality degradation can be prevented. Moreover, in the present embodiment, the character region is represented by a black color and is thus defined as the black region. That is, since the character image 61 is rendered in a black color, even if it overlaps with the modification image 64, it never occurs that the character becomes hard to make out.

As shown in FIG. 21, in a case where each of the character image 61 and the ground image 62 incurs misregistration, the modification image 64 is exposed between the character image 61 and the ground image 62. By virtue of the exposure of the modification image 64 between the character image 61 and the ground image 62, it is possible to prevent the exposure of the recording medium 63 between the character image 61 and the ground image 62 and thereby suppress ensuing image quality degradation. This advantage of the invention is especially remarkable if the recording medium 63 has a white color.

Moreover, since the modification region is represented by the same color as that of the ground region, even if the modification image 64 is created on the image formed on the recording medium, the size of the character image 61 remains unchanged. Accordingly, it is possible to avoid that the character and symbol become hard to make out in the image formed on the recording medium.

The modification region processing section 18 is so designed that the modification region includes, out of the image represented by the image data, a predetermined area range which conforms to a part extending from the boundary between the character region and the ground region to a certain character region-side location in terms of the directions corresponding to the main scanning direction X and the sub scanning direction Y, respectively, in which an image is formed on the recording medium by the color image output unit 4. In this way, even if the images formed by the recording agents C, M, Y, and K, respectively, are positionally deviated relative to one another in either of the main scanning direction X and the sub scanning direction Y, the exposure of the surface of the recording medium 63 between the character image 61 and the ground image 62 can be prevented successfully. Note that the modification image 64 is formed also in a region 66 facing a corner of the ground image 62. This is achieved by making a modification region adjustment in such a way that the modification region includes, at the corner of the ground region, a predetermined area range which conforms to a part extending from the boundary between the character region and the ground region to a certain character region-side location in terms of a 45 degree-oblique direction. In the presence of the modification image 64 also in the region 66, even if the images formed by the recording agents C, M, Y, and K, respectively, are positionally deviated relative to one another in both of the main scanning direction X and the sub scanning direction Y, the exposure of the surface of the recording medium 63 between the character image 61 and the ground image 62 can be prevented successfully.

The modification region processing section 18 specifies, as the modification region, a predetermined area range which conforms to a part extending from the boundary between the character region and the ground region to a certain character region-side location. Accordingly, the modification image 64 is formed in a predetermined area range T which conforms to a part extending from the boundary between the character image 61 and the ground image 62 to the character image 61-present location. The modification region is so selected as to fall in a range of from 50 μm to 200 μm in a direction from the boundary to the character region, and correspondingly the predetermined area range T is so selected as to fall in a range of from 50 μm to 200 μm. In the present embodiment, the predetermined area range depends upon the number of pixels, and is thus selected as a n1-pixel range in a direction from the boundary to the character region. For example, in the color image output unit 4 having a resolution of 600 dpi, the range of 200 μm is equal to approximately 5 dots. Therefore, the number of pixels n1 is so selected as to fulfill the condition where $1 \leq n1 \leq 5$.

Figure 22:
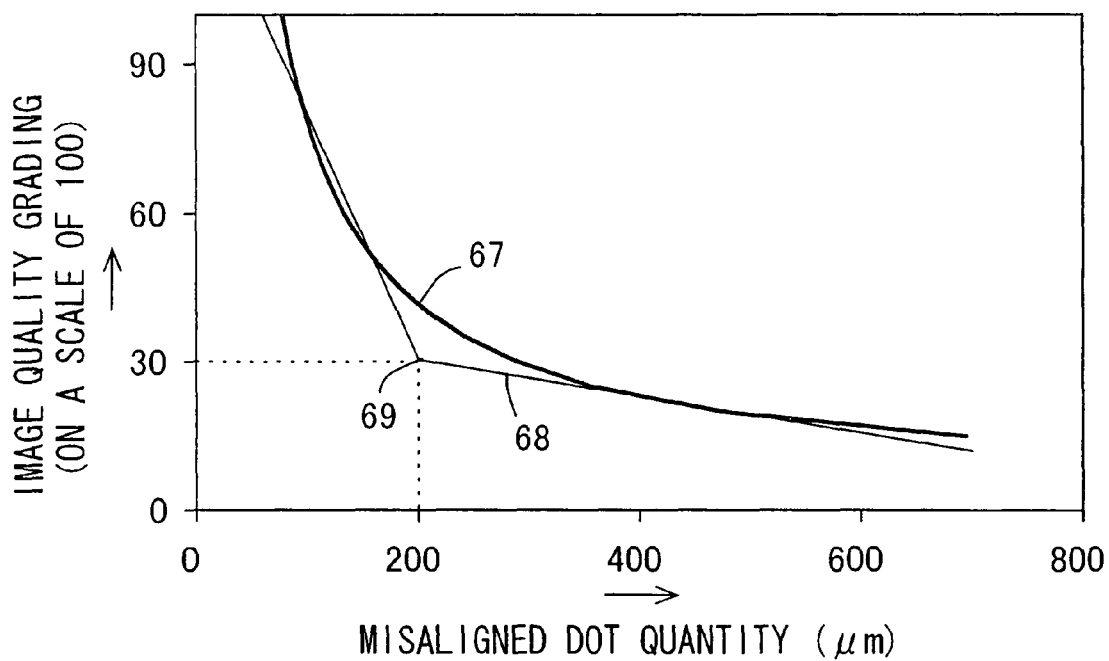
FIG. 22 is a graph obtained by making polygonal line-approximation on a graph indicating the degree of misregistration and image quality grading.

FIG. 22 is a graph obtained by making polygonal line-approximation on a graph indicating the degree of misregistration and image quality grading. The graph indicating the degree of misregistration and image quality grading is described in a reference "Zoku denshishashin gijutsu to sono oyo (Electrophotographic technology and its applications), edited by The Society of Electrophotography of Japan (Corona Publishing Co., Ltd., November 1996 (p. 210, FIG. 1. 145 "registration accuracy and image quality grading)". In FIG. 22, the quantity of misaligned dots (μm) is taken along the horizontal axis, and the grading of image quality is taken along the vertical axis. Image quality is expressed in scale of one to hundred. In a case where the graph 67 indicating the degree of misregistration and image quality grading is subjected to approximation with a polygonal line 68, the degree of misregistration at an inflection point 69 of the polygonal line 68 is given as approximately 200 μm. In the color image output unit 4 having a resolution of 600 dpi, 200 μm is equal to approximately 4 dots. It will be understood from the graph that the quality of an image is sharply declined even under the condition where the quantity of misaligned dots ranges downwardly from 200 μm. In light of the foregoing, by setting the predetermined area range at or below 200 μm, even if the quantity of misaligned dots ranges downwardly from 200 μm in the color image output unit having a resolution of 600 dpi, it is possible to make the recording medium 63 invisible between the character image 61 and the ground image 62.

Figure 23:
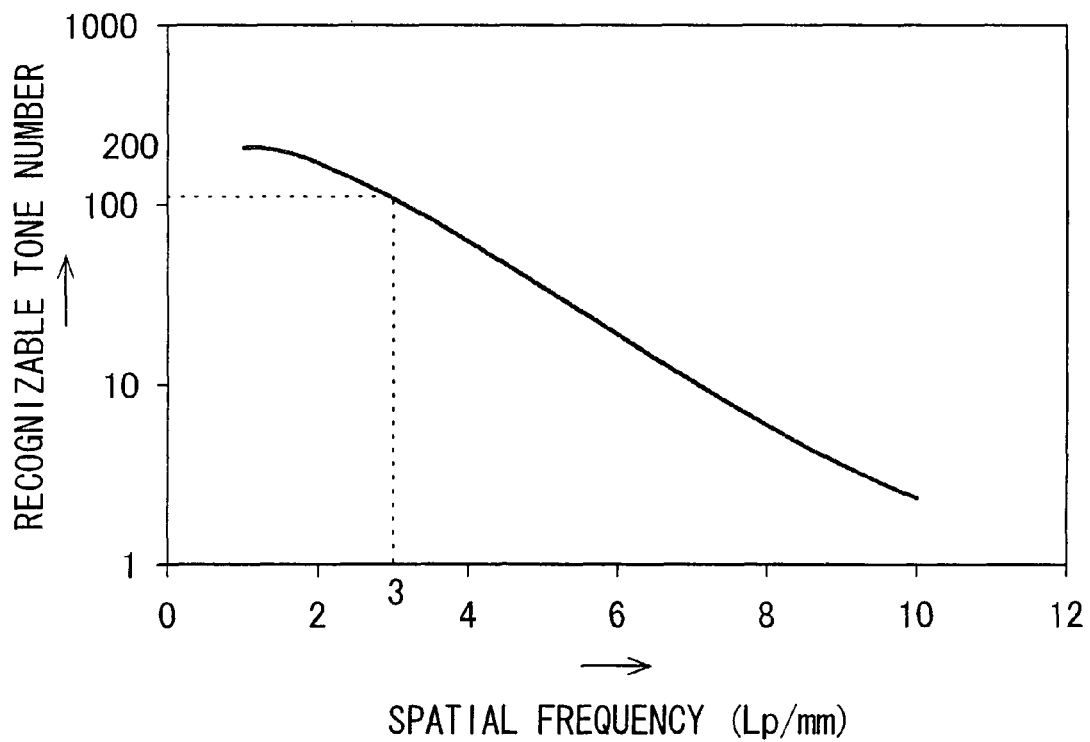
FIG. 23 is a graph indicating the relationship between spatial frequency and recognizable tone number.

FIG. 23 is a graph indicating the relationship between spatial frequency and recognizable tone number. The spatial frequency refers to the number of lines per unit length (1 mm). Herein, the width of line and the width of pitch are equal to each other. The recognizable tone number refers to the number of tones that are recognizable by human eyes. Given the quantity of misaligned dots of 200 μm, then the spatial frequency stands at approximately 3 Lp/mm. The recognizable tone number exceeds 100 at the spatial frequency of 3 Lp/mm. This leads to easiness in tone recognition by human eyes. In a case where the quantity of misaligned dots is decreased to 200 μm or below, the smaller is its value, the smaller is the recognizable tone number. This leads to difficulty in tone recognition by human eyes.

Moreover, the quantity of misaligned dots, namely the degree of relative misregistration of the character image 61 and the ground image 62 as observed in the color image output unit 4 is, at most, approximately 200 μm at the maximum. Accordingly, in the image forming apparatus 1 of the invention, even if misregistration of dots of the CMYK-signal image data occurs due to variation in assembly accuracy and quality deterioration with time associated with the color image output unit 4, the exposure of the recording medium 63 can be prevented with the provision of the modification image 64. As a result, image quality degradation can be prevented successfully.

The storage section 22 stores therein the data indicating the aforestated predetermined area range. The modification region processing section 18 specifies the modification region on the basis of the data on the predetermined area range stored in the storage section 22. That is, the predetermined area range indicated by the data stored in the storage section 22 is specified as the modification region. For example, in a case where the storage section 22 is factory-adjusted to store therein the data of an optimal area range determined in conformity with the image forming apparatus, image quality degradation can be prevented without fail.

The control section 23 functions as an area-range changing section for making a change to the area-range data stored in the storage section 22. In response to predetermined input data from the operating panel 5, the area-range data stored in the storage section 22 can be altered by the control section 23. This allows users to alter the area-range data in response to the condition of usage of the image forming apparatus 1. Accordingly, it is possible to cope with image quality degradation caused by, for example, image misregistration that has yet to be handled at the time of shipment or image misregistration that occurs in accompaniment with the quality deterioration of the image forming apparatus 1 with time.

Moreover, since the modification region is formed in a part of the periphery of the character region which is contiguous to the ground region, it is possible to reduce the amount of consumption of the recording agent for use in the modification image 64 constituted by the modification region.

By way of another embodiment of the invention, the modification region processing section may be so designed that the modification region includes, out of the image represented by the image data, a predetermined area range which conforms to a part extending from the boundary between the character region and the ground region to a certain character region-side location in terms of the direction corresponding to the main scanning direction X or the sub scanning direction Y in which an image is formed on the recording medium by the color image output unit 4. In a case where the modification region includes, out of the image represented by the image data, a predetermined area range which conforms to a part extending from the boundary between the character region and the ground region to a certain character region-side location in terms of the direction corresponding to the main scanning direction X in which an image is formed on the recording medium by the color image output unit 4, in the image data-based image processing operations, since the image data is processed on a pixel-by-pixel basis in turn along the main scanning direction, it is possible to lighten data processing loads entailed by the setting of the modification region through the detection of the boundary between the character region and the ground region.

On the other hand, in a case where the modification region includes, out of the image represented by the image data, a predetermined area range which conforms to a part extending from the boundary between the character region and the ground region to a certain character region-side location in terms of the direction corresponding to the sub scanning direction Y in which an image is formed on the recording medium by the color image output unit 4, since the misregistration of images that have been formed of the individual recording agents is likely to occur in the sub scanning direction, it is possible to suppress the misregistration of images formed by the individual recording agents. As another advantage, image quality degradation resulting from the formation of the modification region can be reduced to a minimum.

By way of still another embodiment of the invention, the modification region processing section 18 may also be designed to detect, out of the character region, a black color-corresponding region as the first region. In an original image, in general, a character is rendered in a black color, and, in a black-color region, image formation is effected with use of the recording agent K alone. Therefore, a gap is likely to appear between the black-color region and a region surrounding it. In a case where an image is formed on a white-color recording medium, if part of the white-color recording medium is exposed at the periphery of the first region rendered in a black color, the quality of the image will be degraded significantly due to a high degree of contrast. In this regard, according to the invention, in a case where an image is formed on a white-color recording medium, even if a black color-rendered region is present in the character region, image quality degradation can be prevented successfully.

By way of further embodiment of the invention, the detecting section may be designed to detect the first region and the second region on the basis of the brightness and chroma of each of the pixels in the image data. In this case, since the first region and the second region are detected by the detecting section on the basis of the brightness and chroma of each of the pixels in the image data, there is no need for either of the first region and the second region to be a complete Pure Black region. That is, even if neither of the first region and the second region is a complete Pure Black region, so long as the first and second regions exhibit different colors, it is possible to detect these regions on an individual basis. Accordingly, in images of various types, the first and second regions can be detected properly, whereby making the aforestated setting of the modification region possible. This helps increase the possibility of providing the aforestated advantages of the invention in dealing with formation of various types of images.

In order to derive the brightness on the basis of the R (red), G (green), B (blue)-corresponding signals, the calculation may be made in accordance with the widely-used NTSC (National Television Standards Committee)-compliant video signal system given by the following formula:

$$Y(\text{brightness}) = 0.299 \times R + 0.587 \times G + 0.114 \times B$$

There are several methods to derive the chroma. For example, a value obtained simply by exploiting the differential between the maximum value and the minimum value in the R, G, B-corresponding signals can be used in substitution for the chroma.

In the detecting section (the region separation processing section 15, the modification region processing section 18), brightness/chroma calculations are performed on the basis of the R, G, B-corresponding signals (or Y (yellow), M (magenta), C (cyan)-corresponding signals) to create a brightness histogram and a chroma histogram. Then, a brightness which peaks in frequency and a chroma which peaks in frequency are extracted. In a case where the frequency-peak brightness is larger than 7 and the frequency-peak chroma is less than 2 (the values shall be subject to Z8721 according to JIS (Japanese Industrial Standards)), the ground region is identified.

The image forming apparatus 1 thus far described may also be realized by allowing a computer to execute a computer-readable program. That is, by executing the program, it is possible to realize the image forming method including the aforestated modification region processing operation. Moreover, the program may be recorded on a computer-readable recording medium in which is stored a program to allow program execution in the computer. This makes it possible to provide a freely portable recording medium in which is stored the program to perform the image forming method including the modification region processing operation. The recording medium for recording the program may be a memory used to perform processing operations in a microcomputer, such as a ROM (Read Only Memory), or may be program media allowing program reading through insertion into a program reading apparatus disposed as an external storage apparatus.

In either case, the program in storage may be designed to be executed through microprocessor access, or, the program, after being read off, may be downloaded into a program storage area of a microcomputer in preparation for execution. In this case, a program for downloading use is stored in the apparatus main body in advance.

Herein, the program media refers to a recording medium which is constructed so as to be separable from the apparatus main body. The examples thereof include: media in tape form such as a magnetic tape and a cassette tape; media in disk form such as a magnetic disk, e.g. a flexible disk and a hard disk, and an optical disk, e.g. a CD-ROM (Compact Disk-ROM), a MO (Magneto Optical Disk), a MD (Mini Disc), and a DVD (Digital Versatile Disk); media in card form such as an IC (Integrated Circuit) card (including a memory card) and an optical card; and semiconductor memory media for holding programs in a fixed manner such as a Mask ROM, an EPROM (Erasable Programmable Read Only Memory), an EEPROM (Electrically Erasable Programmable Read Only Memory), and a Flash ROM.

Moreover, the present embodiment employs a system configuration which allows connection with communication networks including the Internet. Therefore, the recording medium may be such as to hold the program in a mobile manner to allow downloading of the program from the communication network. Note that, in a case where the program is downloaded from the communication network, a program for downloading use may be stored in the apparatus main body in advance or installed from another recording medium.

The recording medium is read by a program reading unit incorporated in a digital color image forming apparatus or a computer system thereby to effect the image forming method described heretofore.

The computer system is composed of an image input apparatus such as a flat-bed scanner, a film scanner, or a digital camera, a computer by which various processing operations including the aforestated image processing method are performed through the loading of predetermined programs, an image display apparatus such as a CRT (Cathode Ray Tube) display or a liquid crystal display for displaying the results of computer processing operations, and a printer for producing output of the results of computer processing operations on a paper sheet or the like. In addition, a network card or modem is disposed as communication means for establishing connection with a server and so forth through networks.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus capable of forming an image on a recording medium on the basis of image data with use of recording agents of either two or more than two colors, comprising:
    a detecting section for detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;
    a region adjusting section for specifying, on the basis of a detection result produced by the detecting section, a third region which is continuous with the second region and overlaps with a part of a periphery of the first region which is contiguous to the second region, and assigning the third region third color data indicating a color that can be represented by the recording agents used for forming the first and second regions; and
    an image forming section for forming an image on a recording medium with use of the recording agents corresponding to the colors indicated by the first to third color data assigned to the first to third regions, respectively.

2. The image forming apparatus of claim 1, wherein the detecting section detects, as the first region, a character region representing characters including a letter and a symbol and also detects, as the second region, a ground region which is a background against which the character region exists, and
    the region adjusting section makes adjustment in a manner so as to insure that the color indicated by the third color data is identical with the color indicated by the second color data.

3. The image forming apparatus of claim 2, wherein the detecting section detects, out of the character region, a black color-corresponding region as the first region.

4. The image forming apparatus of claim 1, wherein the detecting section detects the first and second regions on the basis of the brightness and chroma of each pixel in the image data.

5. The image forming apparatus of claim 1, wherein, in the region adjusting section, the third region includes, out of the image represented by the image data, a predetermined area range which conforms to a part extending from a boundary between the first region and the second region to a certain first region-side location in terms of a direction corresponding to a main scanning direction in which an image is formed on a recording medium by the image forming section.

6. The image forming apparatus of claim 1, wherein, in the region adjusting section, the third region includes, out of the image represented by the image data, a predetermined area range which conforms to a part extending from the boundary between the first region and the second region to a certain first region-side location in terms of a direction corresponding to a sub scanning direction in which an image is formed on a recording medium by the image forming section.

7. The image forming apparatus of claim 5, further comprising a storage section for storing therein the data indicating the predetermined area range,
    wherein the region adjusting section specifies the third region on the basis of the area-range data stored in the storage section.

8. The image forming apparatus of claim 6, further comprising a storage section for storing therein the data indicating the predetermined area range,
    wherein the region adjusting section specifies the third region on the basis of the area-range data stored in the storage section.

9. The image forming apparatus of claim 7, further comprising:
    an input section for inputting predetermined data; and
    an area-range changing section for making a change to the area-range data stored in the storage section in response to the predetermined data inputted by the input section.

10. The image forming apparatus of claim 8, further comprising:
    an input section for inputting predetermined data; and
    an area-range changing section for making a change to the area-range data stored in the storage section in response to the predetermined data inputted by the input section.

11. The image forming apparatus of claim 5, wherein, in the region adjusting section, the predetermined area range is selected as 200 μm or below with respect to the boundary.

12. The image forming apparatus of claim 6, wherein, in the region adjusting section, the predetermined area range is selected as 200 μm or below with respect to the boundary.

13. An image forming method that allows formation of an image on a recording medium on the basis of image data with use of recording agents of either two or more than two colors, comprising the steps of:
    detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;
    specifying, on the basis of a detection result thus produced, a third region which is continuous with the second region and overlaps with a part of a periphery of the first region which is contiguous to the second region, and assigning the third region third color data indicating a color that can be represented by the recording agents used for forming the first and second regions; and forming an image on a recording medium with use of the recording agents corresponding to the colors indicated by the first to third color data assigned to the first to third regions, respectively.

14. A computer-readable non-transient recording medium on which is recorded a program, the program allowing a computer reading the program to operate as an image forming apparatus that is capable of forming an image on a recording medium on the basis of image data with use of recording agents of either two or more than two colors, comprising:

making the computer to function as a detecting section for detecting, out of an image represented by the image data, a first region and a second region, of which the first region is assigned first color data indicating a predetermined color so that it can be formed solely of one of the recording agents that corresponds to the predetermined one color, and the second region, which is arranged adjacent to the first region, is assigned second color data indicating a color different from the predetermined color so that it can be formed of a recording agent different from the recording agent for forming the first region;

a region adjusting section for specifying, on the basis of a detection result produced by the detecting section, a third region which is continuous with the second region and overlaps with a part of a periphery of the first region which is contiguous to the second region, and assigning the third region third color data indicating a color that can be represented by the recording agents used for forming the first and second regions; and an image forming section for forming an image on a recording medium with use of the recording agents corresponding to the colors indicated by the first to third color data assigned to the first to third regions, respectively.

* * * * *